(12) United States Patent
Moy et al.

(10) Patent No.: US 11,797,258 B2
(45) Date of Patent: *Oct. 24, 2023

(54) CONVERSATIONAL ANALYTICS WITH DATA VISUALIZATION SNAPSHOTS

(71) Applicant: Tableau Software, Inc., Seattle, WA (US)

(72) Inventors: Quentin Moy, Mountain View, CA (US); Gaurav Chandna, San Jose, CA (US); Michael Chen, Sunnyvale, CA (US)

(73) Assignee: Tableau Software, Inc., Seattle, WA (US)

( * ) Notice: Subject to any disclaimer, the term of this patent is extended or adjusted under 35 U.S.C. 154(b) by 138 days.

This patent is subject to a terminal disclaimer.

(21) Appl. No.: 17/142,082

(22) Filed: Jan. 5, 2021

(65) Prior Publication Data

US 2021/0124541 A1 Apr. 29, 2021

Related U.S. Application Data

(63) Continuation of application No. 16/140,413, filed on Sep. 24, 2018, now Pat. No. 10,884,694.

(51) Int. Cl.
*G06F 3/0482* (2013.01)
*G06F 3/147* (2006.01)
(Continued)

(52) U.S. Cl.
CPC ............ *G06F 3/147* (2013.01); *G06F 3/0482* (2013.01); *G06F 3/04845* (2013.01);
(Continued)

(58) Field of Classification Search
CPC ................................ G06F 16/11; G16H 40/63
See application file for complete search history.

(56) References Cited

U.S. PATENT DOCUMENTS

| 8,261,193 | B1 | 9/2012 | Alur et al. |
| 2006/0139371 | A1* | 6/2006 | Lavine .................... G06F 3/14 345/620 |

(Continued)

OTHER PUBLICATIONS

Moy, Office Action, U.S. Appl. No. 16/140,413, dated Oct. 22, 2019, 22 pgs.

(Continued)

*Primary Examiner* — Jennifer N Welch
*Assistant Examiner* — Amy P Hoang
(74) *Attorney, Agent, or Firm* — Morgan, Lewis & Bockius LLP

(57) ABSTRACT

A method implements data visualization collaboration. The method displays, for a second user, an interface with a comment pane that displays a first comment text and a first thumbnail image of a data visualization generated according to a first visual specification, from a first user. In response to detecting an input from the second user to select the first thumbnail image, the method generates and displays the data visualization. The method receives, from the second user, input modifying the data visualization, and input specifying a second comment that refers to the data visualization. In response, the method generates a second thumbnail image and a second visual specification corresponding to the modified data visualization, and transmits that information along with the second comment text to the first user.

20 Claims, 25 Drawing Sheets

(51) Int. Cl.
*G06F 16/438* (2019.01)
*G06F 3/04845* (2022.01)
*H04L 65/403* (2022.01)

(52) U.S. Cl.
CPC .......... *G06F 16/438* (2019.01); *H04L 65/403* (2013.01); *G06F 2203/04803* (2013.01)

(56) References Cited

U.S. PATENT DOCUMENTS

| | | |
|---|---|---|
| 2009/0217150 A1 | 8/2009 | Lin |
| 2009/0284530 A1 | 11/2009 | Lester et al. |
| 2010/0188936 A1* | 7/2010 | Beppu ................ H04N 21/4821 368/29 |
| 2013/0097700 A1 | 4/2013 | Chen et al. |
| 2013/0215279 A1 | 8/2013 | Rivas-Micoud et al. |
| 2014/0089800 A1 | 3/2014 | Kao et al. |
| 2014/0249897 A1 | 9/2014 | Znerold et al. |
| 2014/0281870 A1* | 9/2014 | Vogel ...................... G06F 40/18 715/220 |
| 2014/0310613 A1 | 10/2014 | Megiddo et al. |
| 2015/0269146 A1* | 9/2015 | Ayyar ..................... G06F 16/11 707/608 |
| 2015/0347686 A1 | 12/2015 | Ortiz et al. |
| 2016/0285797 A1* | 9/2016 | Beausoleil .............. H04L 63/10 |
| 2017/0039320 A1* | 2/2017 | Shimomura ........... G16H 40/63 |

OTHER PUBLICATIONS

Moy, Final Office Action, U.S. Appl. No. 16/140,413, dated Mar. 2, 2020, 24 pgs.

Moy, Notice of Allowance, U.S. Appl. No. 16/140,413, dated Sep. 25, 2020, 7 pgs.

\* cited by examiner

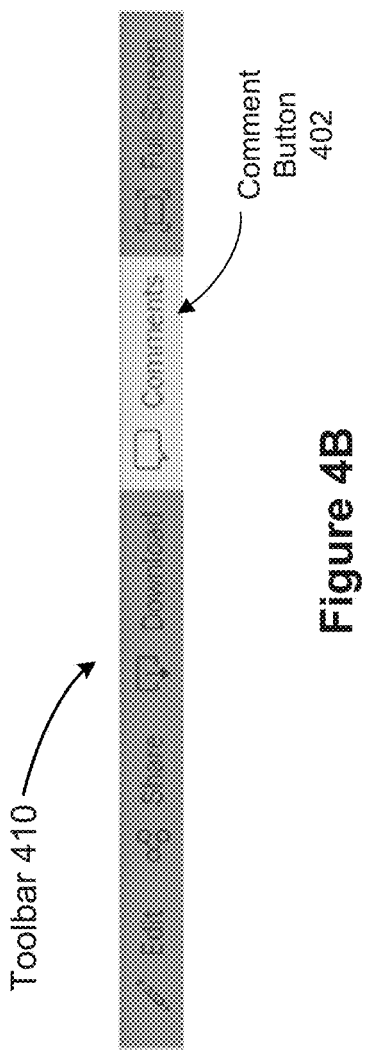
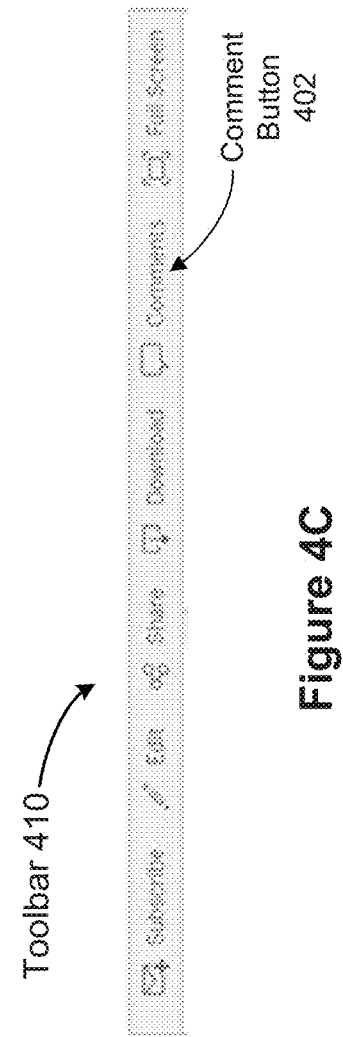
Figure 4B
Figure 4C

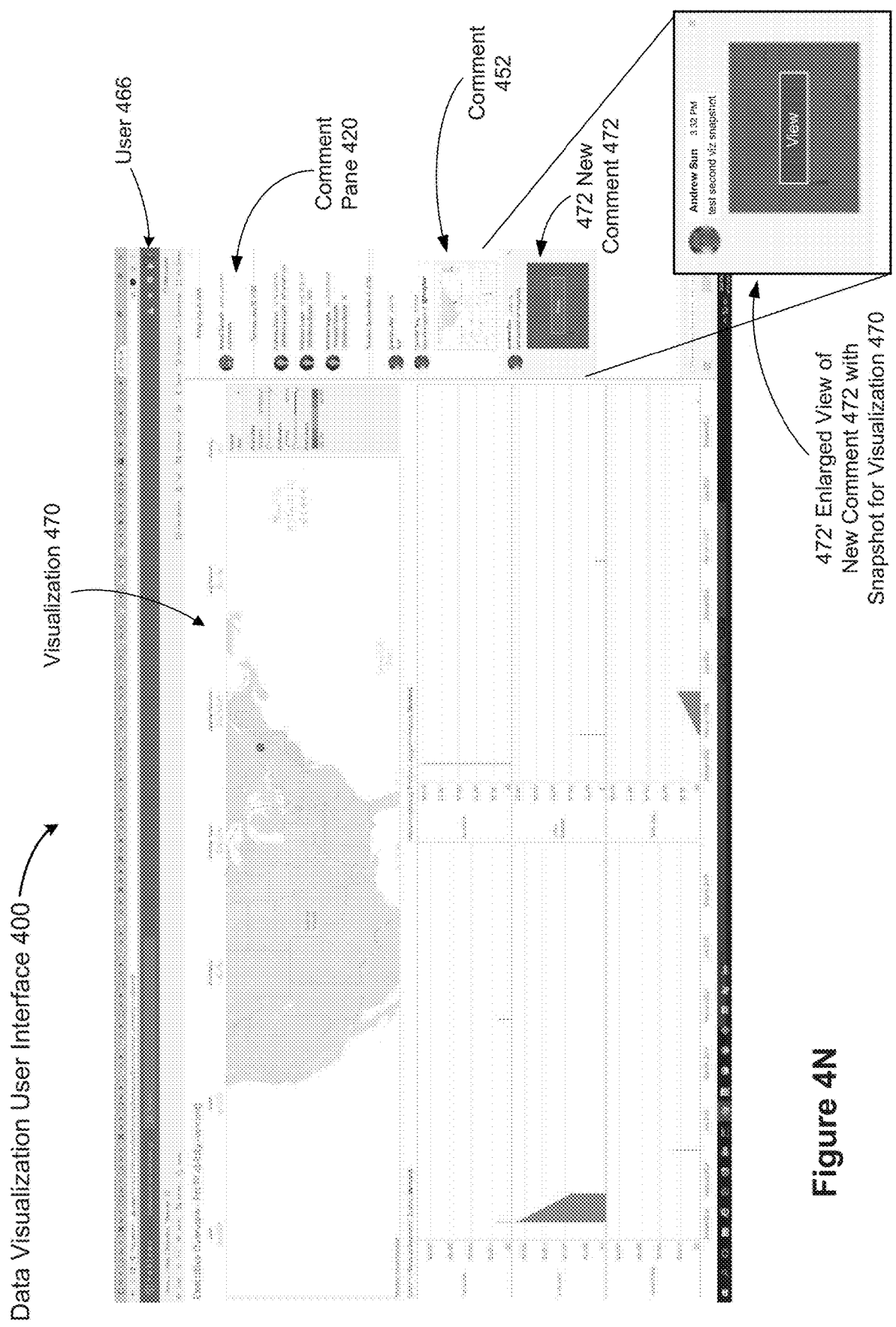

CONVERSATIONAL ANALYTICS WITH DATA VISUALIZATION SNAPSHOTS

RELATED APPLICATIONS

This application is a continuation of U.S. application Ser. No. 16/140,413, filed Sep. 24, 2018, and entitled "Conversational Analytics with Data Visualization Snapshots," which is incorporated by reference herein in its entirety.

TECHNICAL FIELD

The disclosed implementations relate generally to data visualization and more specifically to systems, methods, and user interfaces that implement conversational analytics with data visualization snapshots.

BACKGROUND

Data visualization applications enable a user to understand a data set visually, including distribution, trends, outliers, and other factors that are important to making business decisions. In some cases, developing a data visualization is a collaborative process, because of shared ownership of the task, because one analyst needs help to build a desired data visualization, or because the analyst wants feedback from one or more colleagues before presenting a data visualization to a larger audience. People can collaborate in many ways, including in-person meetings, email, and instant messaging. In-person meetings are not always possible or convenient, and electronic communication lacks context. For example, if a first analyst has a problem building a data visualization, and sends a screenshot in email to another user, the other user has no way to interactively troubleshoot the problem. Even if the second user has access to the workbook for the data visualization, the underlying data may have changed and the second user may not be able to recreate the same view as the analyst.

SUMMARY

Disclosed implementations address the above deficiencies and other problems associated with collaborative and interactive analysis of a data set.

In accordance with some implementations, a method of data visualization collaboration is performed at a computer having a display, one or more processors, and memory storing one or more programs configured for execution by the one or more processors. The process receives, from a first user, a first comment that refers to a data visualization, wherein the data visualization is based on a data set retrieved from a database using a set of one or more queries and the first comment includes i) first comment text, ii) a first thumbnail image of the data visualization, and iii) a first visual specification that specifies a plurality of parameters to build the data visualization from the data set. The process displays a data visualization user interface, including a comment pane, for a second user. The comment pane displays the first comment text and the first thumbnail image. The process detects user input from the second user to select the first thumbnail image. In response to the detected user input, the process generates the data visualization according to the first visual specification, including retrieving a second data set from the database according to the set of one or more queries, and displaying the data visualization in the data visualization user interface. The process receives one or more user inputs (e.g., to apply filters, to scroll, or to highlight data marks) from the second user, modifying the displayed data visualization. The process receives user input in the comment pane, from the second user, specifying second comment text for a second comment that refers to the data visualization. In response to receiving the user input in the comment pane, from the second user, the process captures a second thumbnail image of the modified data visualization, and saves a second visual specification that specifies parameters to build the modified data visualization from the second data set. The process transmits the second comment text, the second thumbnail image, and the second visual specification to the first user.

In some implementations, the process saves the second visual specification by identifying a first set of parameters included in the first visual specification, determining a second set of parameters used to build the modified data visualization, and determining the differences between the first set of parameters and the second set of parameters. The differences are stored in the second visual specification.

In some implementations, the process saves the second visual specification by identifying a second set of parameters that specify how to build the modified data visualization from the second data set, and for each parameter of the second set of parameters: when the respective parameter matches a corresponding parameter in the first visual specification, not storing the respective parameter in the second visual specification; and when the respective parameter does not match a corresponding respective parameter in the first visual specification, determining and storing a respective parameter difference in the second visual specification.

In some implementations, the first data set and the second data set are the same. In some implementations, the first data set and the second data set are different (e.g., the underlying data in the database has changed).

In some implementations, prior to displaying the data visualization, the process determines whether the second user has limited permission to access the first dataset. When the second user has limited permission to access the first dataset, the process aborts the display of the data visualization. When the second user has unlimited permission to access the first dataset, the process displays the data visualization.

In some implementations, the first visual specification further includes display parameters of the display used by the first user. Displaying the data visualization for the second user includes resizing the data visualization according to display parameters of the display at the computer of the second user.

In some implementations, the first visual specification and the second visual specification each contain a full set of parameters necessary for building a data visualization from a data set.

In some implementations, the process further detects an identifier in the second comment that corresponds to a third user. In response to the detected identifier, the process sends (e.g., via an e-mail) the second comment text, second thumbnail image, and second visual specification to the third user. In some implementations, the process further detects user input from the third user to select the second thumbnail image. In response to the detected user input, the process displays a data visualization interface for the third user, generates a data visualization according to the second visual specification, including retrieving a third data set from the database according to the set of one or more queries, and displays the data visualization in the data visualization user interface.

In some implementations, the process further orders the comments (e.g., using creation timestamps), including the first comment and the second comment that refer to the data visualization, and displays the ordered comments in the comment pane.

In accordance with some implementations, a system for data visualization collaboration includes a display, one or more processors, memory, and one or more programs stored in the memory. The programs are configured for execution by the one or more processors. The programs include instructions for performing any of the methods described herein.

In accordance with some implementations, a non-transitory computer readable storage medium stores one or more programs configured for execution by a computer system having one or more processors and memory. The one or more programs include instructions for performing any of the methods described herein.

Thus methods, systems, and graphical user interfaces are provided that enable users to share and collaboratively develop data visualization in an efficient way.

BRIEF DESCRIPTION OF THE DRAWINGS

For a better understanding of the aforementioned implementations of the invention as well as additional implementations, reference should be made to the Description of Implementations below, in conjunction with the following drawings in which like reference numerals refer to corresponding parts throughout the figures.

Figure 1:
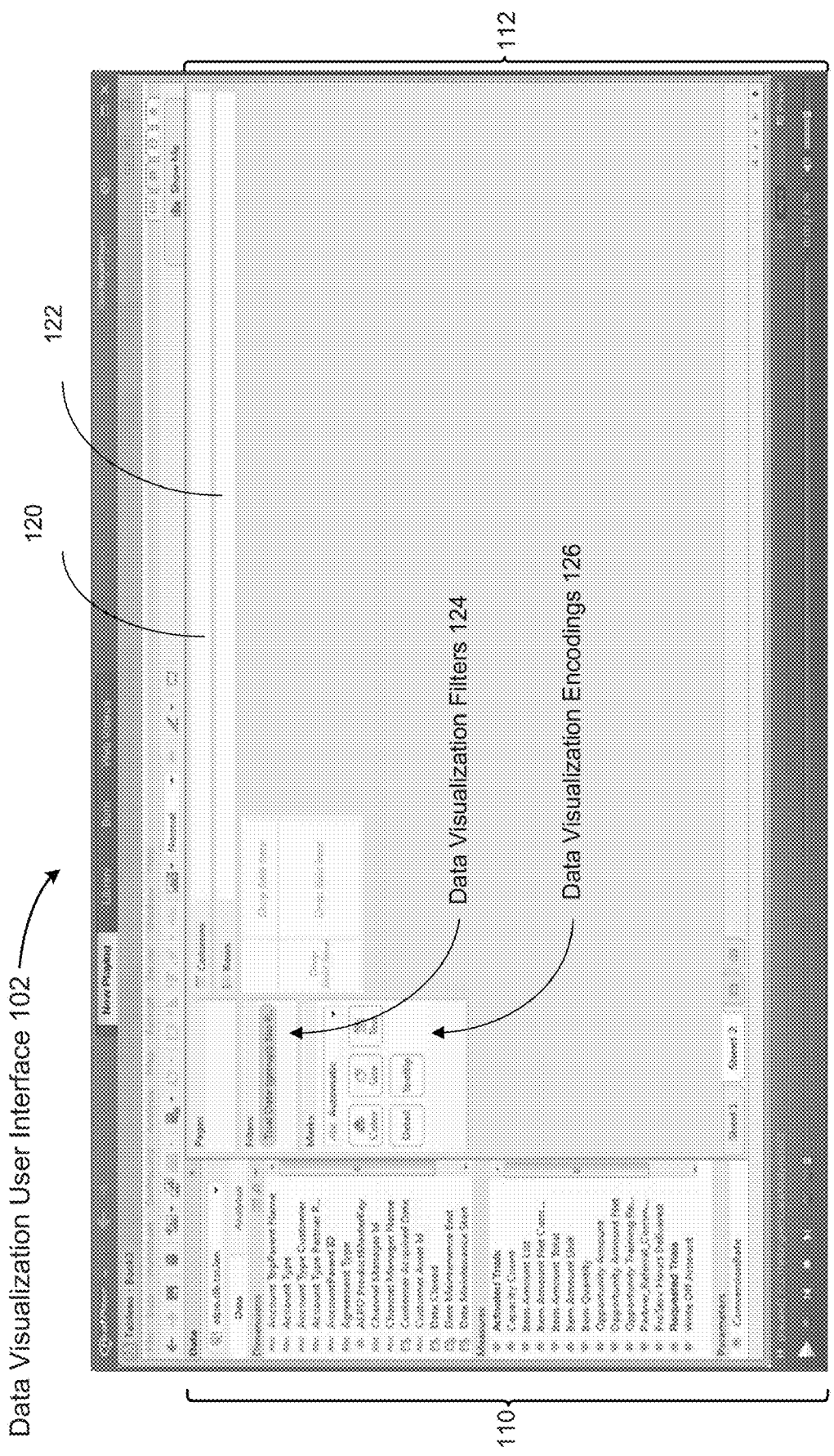
FIG. 1 provides an example data visualization user interface according to some implementations.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Disclosed implementations provide various benefits for interactive and collaborative data analysis by providing a lightweight mechanism for users to establish context for a comment with a visualization snapshot.

Data analysis begins with a user crafting an individual data visualization or multiple data visualizations on a dashboard. Data analysis may investigate peculiar aspects as seen in a data visualization through a series of questions. Data analysis is therefore conversational and continues with feedback from multiple users. When a user writes a comment that refers to something in a visualization, the user has the option to provide a snapshot so that readers of the comment have context about what the user is referring to. The user may be commenting about a data trend, or may have applied filters, scrolling, and highlighting to identify a particular element within the visualization. The visualization snapshot captures the visualization as the user sees it while making the comment. When a viewer views the comment and selects the snapshot, the visualization can be reproduced reliably and quickly so that the comment can be properly understood. Furthermore, the viewer reading the comment may choose to explore the state of the data visualization shown in the visualization snapshot. For example, after reading the comment, the viewer may start with the visualization in the same form as when the author of the comment saw it. The viewer can then further filter the data or alter the visualization to find new insights.

Disclosed implementations overcome various challenges in order to provide users with the required functionality for conversational analytics. For example, from the moment a comment is made with a reference to a data visualization, the underlying data for the data visualization can change, which causes the visualization to render differently when subsequently viewed. Because of this, the data that the creator wanted to call attention to may have changed or no longer be present. In another example, another user could publish a new revision of the visualization. A viewer of the comment could view the comment on a device with a substantially different screen size relative to the creator of the comment. The visualization referred to in the comment could use a relative date filter. When the viewer looks at the visualization at a later date, the visualization could end up showing more recent data. The filters the creator or the author of the comment used could be different from that of the viewer. Disclosed implementations address these issues.

To reproduce a previous state of a live visualization (e.g., the state of the visualization as the author of a comment saw it), a system could store a snapshot of the data set, the revision of the data visualization that was used to create it, the values of all the filter parameters (e.g., a custom view), the width and height of the data visualization, and the scroll positions of any scrollable regions as seen by the person writing the comment. But storing a data extract for each comment on a visualization could increase storage requirements considerably, and degrade performance because generating an extract is expensive. Some implementations support a type of extract that captures only aggregated data, but such solutions have problems with response time and/or user experience. Also, rendering a live custom view in response to user selection of a comment can be time consuming.

Some implementations save both a static image and a custom view for every comment that includes a snapshot (i.e., the comment makes a reference to a data visualization). Doing so enables quick browsing of the comments because only the saved static image is displayed. Viewers can then analyze by exploring the data visualization after the system loads the custom view associated with the snapshot. A user viewing the comment thus has two options: view the static snapshot image, or apply the custom view associated with the snapshot to the visualization for a more in-depth exploration of the actual data set. Saving the image is useful because browsing comments could be very slow for some visualizations if a custom view had to load each time a user chooses to look at a snapshot. Additionally, the static image can reproduce the exact appearance of the visualization at the time of the comment even if the data or the visualization changes. The custom view allows users to explore the data themselves without attempting to recreate the visualization as it was when the comment was made.

FIG. 1 shows a data visualization user interface 102 in accordance with some implementations. The user interface 102 includes a schema information region 110, which is also referred to as a data pane. The schema information region 110 provides named data elements (field names) that may be selected and used to build a data visualization. In some implementations, the list of field names is separated into a group of dimensions and a group of measures (typically numeric quantities). Some implementations also include a list of parameters. The graphical user interface 102 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic.

A user selects one or more data sources 106 (which may be stored on the computing device 200, described below in reference to FIG. 2, or stored remotely), selects data fields from the data sources 106, and uses the selected fields to define a visual graphic. In some implementations, the information the user provides is stored as a visual specification 228 (described below in reference to FIG. 2). In some implementations, the data visualization application 222 includes a data visualization virtual machine (not shown), which takes a data flow graph, and renders a corresponding visual graphic (data visualization). The data visualization application 222 displays the generated graphic in the data visualization region 112.

Figure 2:
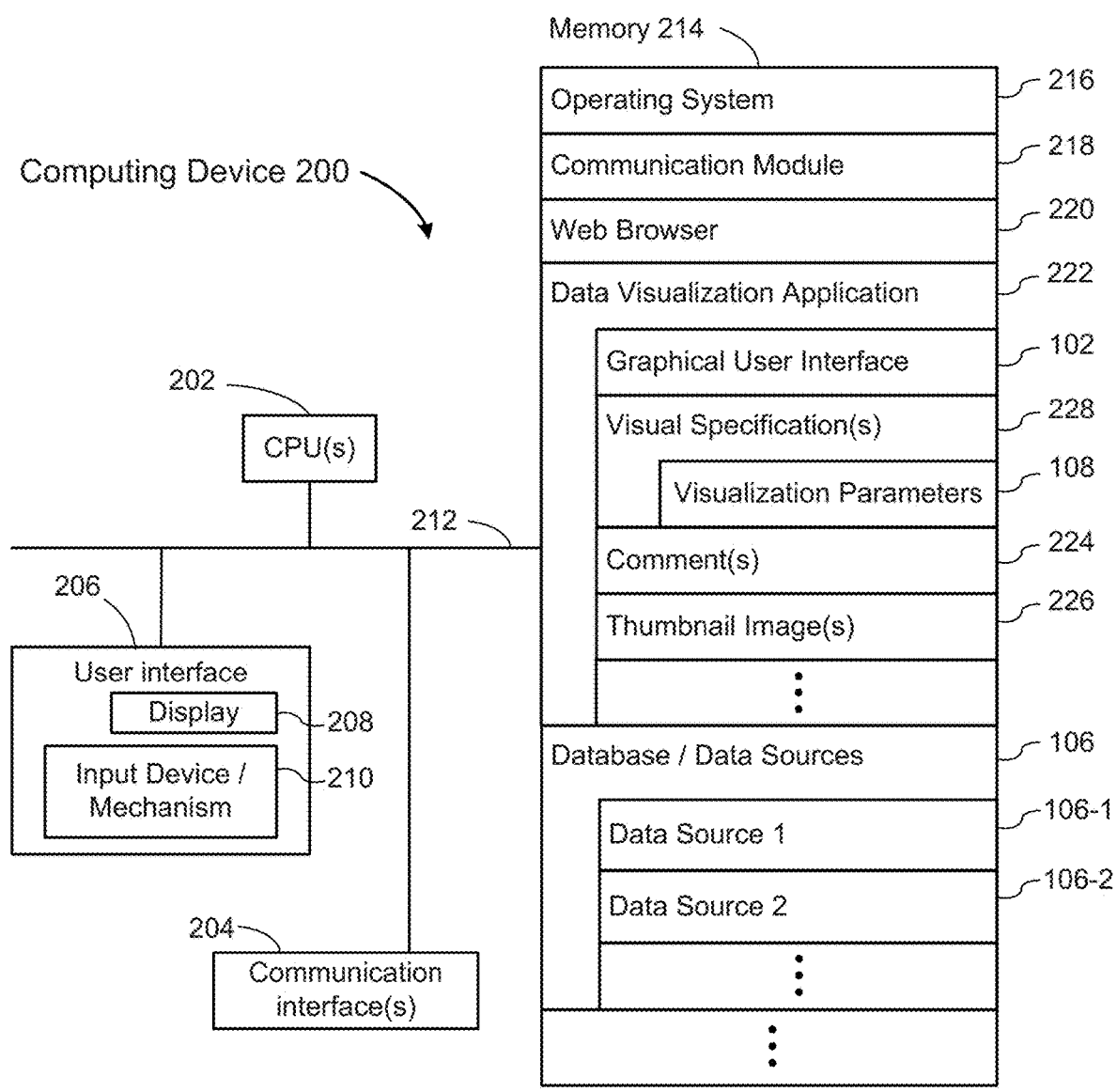
FIG. 2 is a block diagram of a computing device according to some implementations.

FIG. 2 is a block diagram illustrating a computing device 200 that can display a data visualization. A computing device may also display a graphical user interface 102 for the data visualization application 222. Computing devices 200 include desktop computers, laptop computers, tablet computers, and other computing devices with a display and a processor capable of running a data visualization application 222. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display device 208 and one or more input devices or mechanisms 210. In some implementations, the input device/mechanism includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternatively the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communication module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 102 for a user to construct visual graphics (e.g., an individual data visualization or a dashboard with a plurality of related data visualizations). In some implementations, the data visualization application 222 executes as a standalone application (e.g., a desktop application). In some implementations, the data visualization application 222 executes within the web browser 220 (e.g., as a web application 322);
- visual specifications 228, which are used to define characteristics of a desired data visualization. In some implementations, a visual specification 228 is built using the user interface 102. In some implementations, at least part of the information for a visual specification 228 is stored as a set of visual parameters 108 (e.g., as key-value pairs);
- comments 224, which are created by users to collaborate regarding data visualizations;
- thumbnail images 226, which contain thumbnail images of one or more data visualizations and may be associated with comments 224; and
- zero or more databases or data sources 106 (e.g., a first data source 106-1 and a second data source 106-2), which are used by the data visualization application 222 or data visualization web application 322. In some implementations, the data sources can be stored as spreadsheet files, CSV files, XML files, flat files, or as tables in a relational database.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
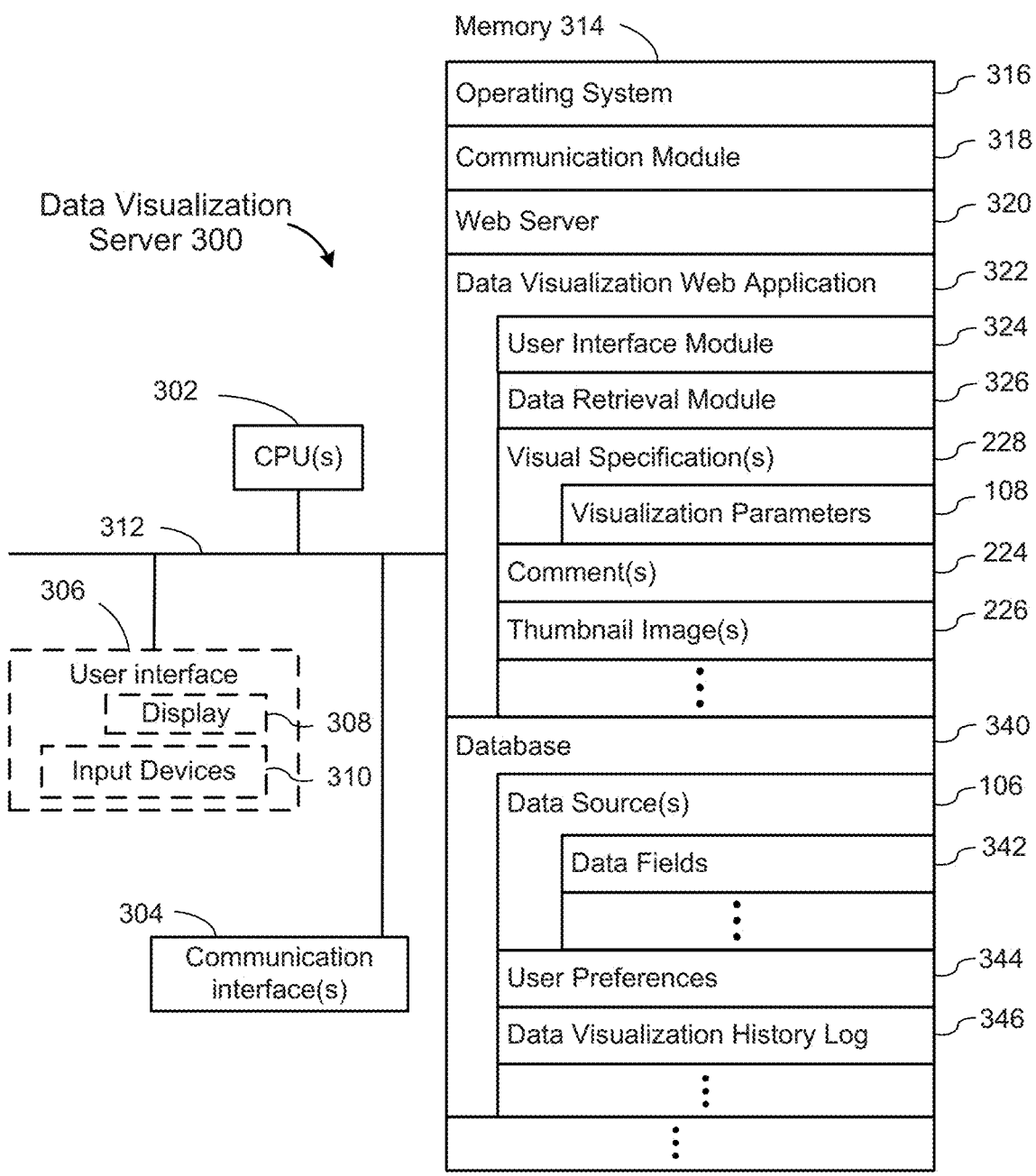
FIG. 3 is a block diagram of a data visualization server according to some implementations.

FIG. 3 is a block diagram of a data visualization server 300 in accordance with some implementations. A data visualization server 300 may host one or more databases 340 and/or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display device 308 and one or more input devices 310, such as a keyboard and a mouse. In some implementations, the communication buses 312 include circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory device(s) within the memory 314, comprises a non-transitory computer readable storage medium.

In some implementations, the memory 314 or the computer readable storage medium of the memory 314 stores the following programs, modules, and data structures, or a subset thereof:
- an operating system 316, which includes procedures for handling various basic system services and for performing hardware dependent tasks;
- a network communication module 318, which is used for connecting the server 300 to other computers via the one or more communication network interfaces 304 (wired or wireless) and one or more communication networks, such as the Internet, other wide area networks, local area networks, metropolitan area networks, and so on;
- a web server 320 (such as an HTTP server), which receives web requests from users and responds by providing responsive web pages or other resources;
- a data visualization web application 322, which may be downloaded and executed by a web browser 220 on a user's computing device 200. In general, a data visualization web application 322 has the same functionality as a desktop data visualization application 222, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the web application includes a data retrieval module 326, which builds and executes queries to retrieve data from one or more data sources 106. The data sources 106 may be stored locally on the server 300 or stored in an external database 340. In some implementations, data from two or more data sources may be blended. In some implementations, the data retrieval module 326 uses a visual specification 228 to build the queries. In some implementations, all or part of a visual specification is saved as a set of visualization parameters 108, as described above with respect to FIG. 2;
- comments 224, which allows users to collaborate regarding data visualizations;
- thumbnail images 226, which contain thumbnail images of one or more data visualizations, and may be saved in conjunction with comments; and
- one or more databases 340, which store data used or created by the data visualization web application 322 or data visualization application 222. The databases 340 may store data sources 106, which provide the data used in the generated data visualizations. A typical data source 106 has a plurality of data fields 342. In some implementations, the databases 340 store user preferences 344 for data visualization. In some implementations, the databases 340 include a data visualization history log 346. In some implementations, the history log 346 tracks each time a data visualization is rendered.

The databases 340 may store data in many different formats, and commonly includes many distinct tables, each with a plurality of data fields 342. Some data sources comprise a single table. The data fields 342 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 342 are stored separately from the data source 106. In some implementations, the database 340 stores a set of user preferences 344 for each user. The user preferences may be used when the data visualization web application 322 (or application 222) makes recommendations about how to view a set of data fields 342. In some implementations, the database 340 stores a data visualization history log 346, which stores information about each data visualization generated. In some implementations, the database 340 stores other information, including other information used by the data visualization application 222 or data visualization web application 322. The databases 340 may be separate from the data visualization server 300, or may be included with the data visualization server (or both).

In some implementations, the data visualization history log 346 stores the visual specifications selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, version of the data visualization software, and so on.

In some implementations, the comments 224 cross-reference visual specification(s) 228 and/or thumbnail image(s) 226 so as to provide quick access to the individual visual specifications and/or thumbnail images included in the comments.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically co-located (e.g., the individual physical devices could be spread throughout the United States or throughout the world).

Figure 4A:
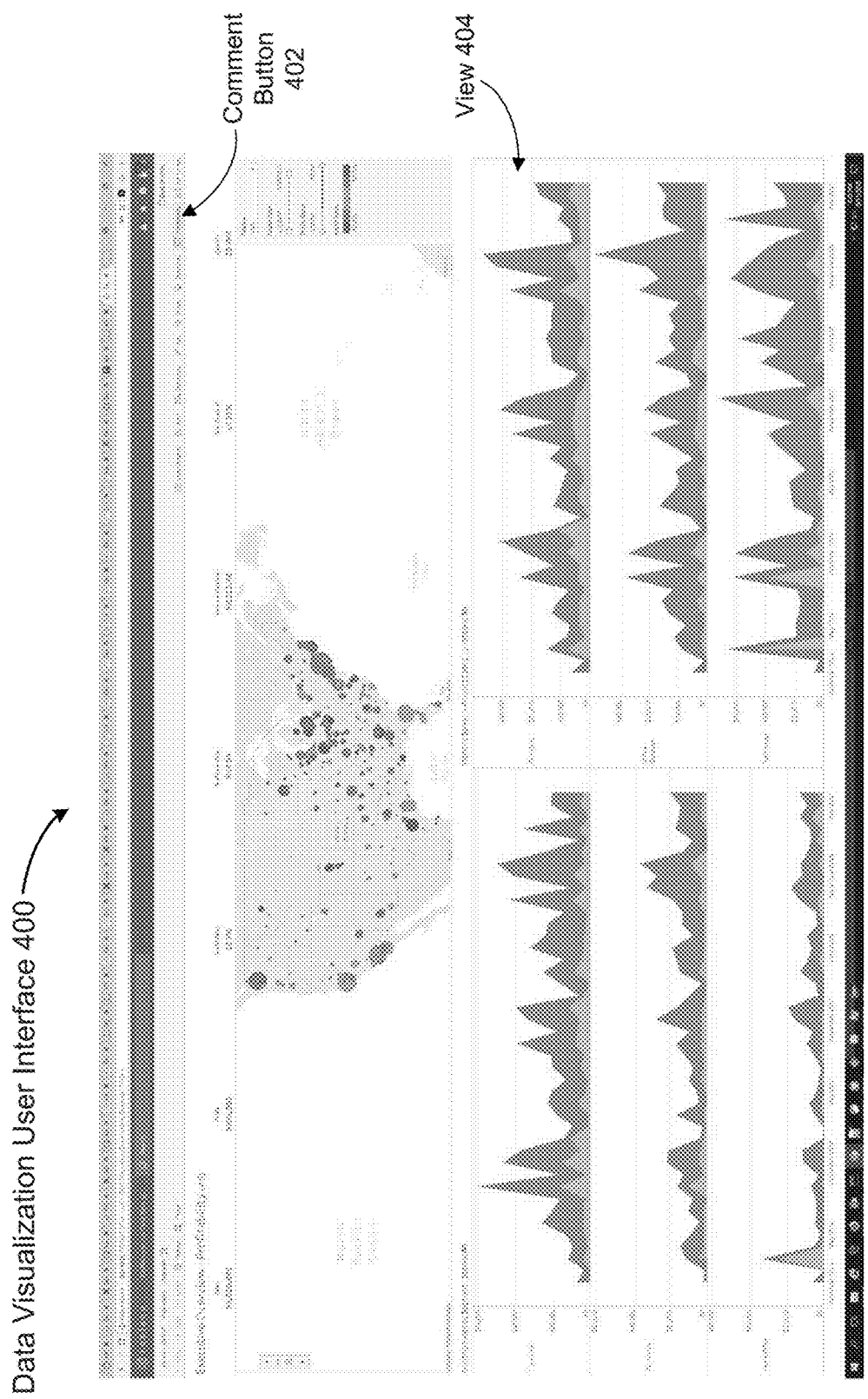
FIGS. 4A-4O illustrate the use of snapshots to establish context for comments, according to some implementations.
Figure 4D:
Figure 4E:
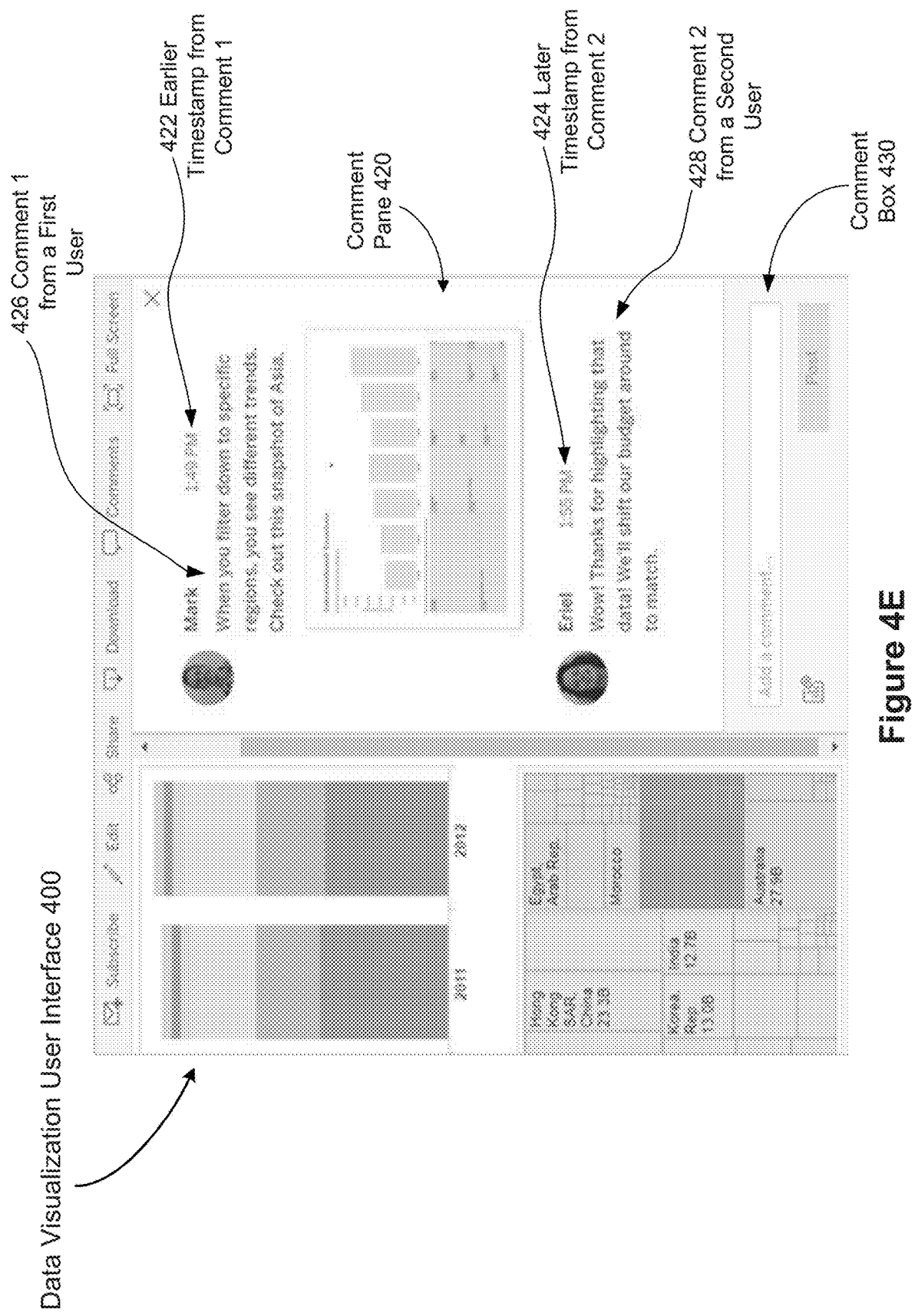
Figure 4F:
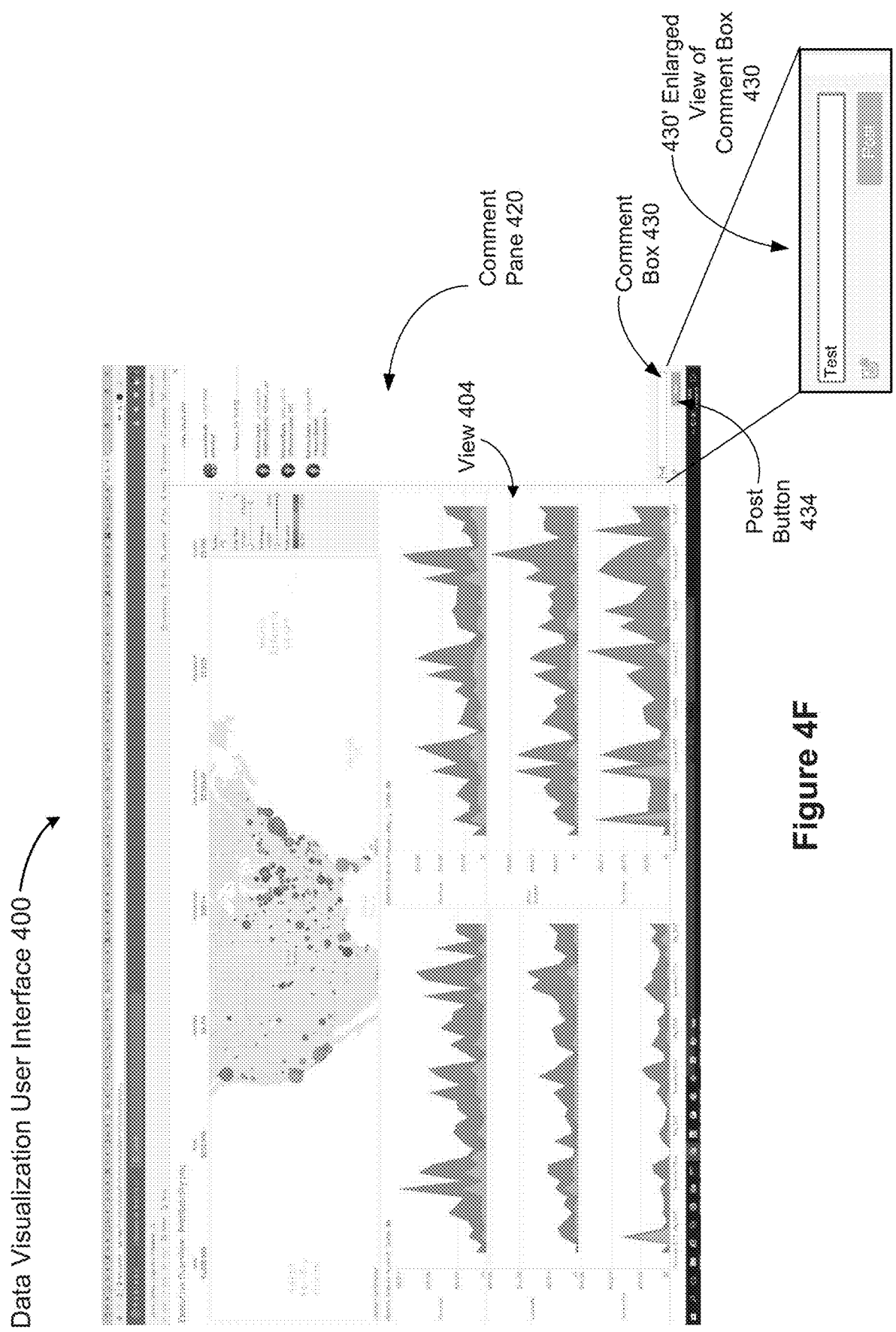
Figure 4G:
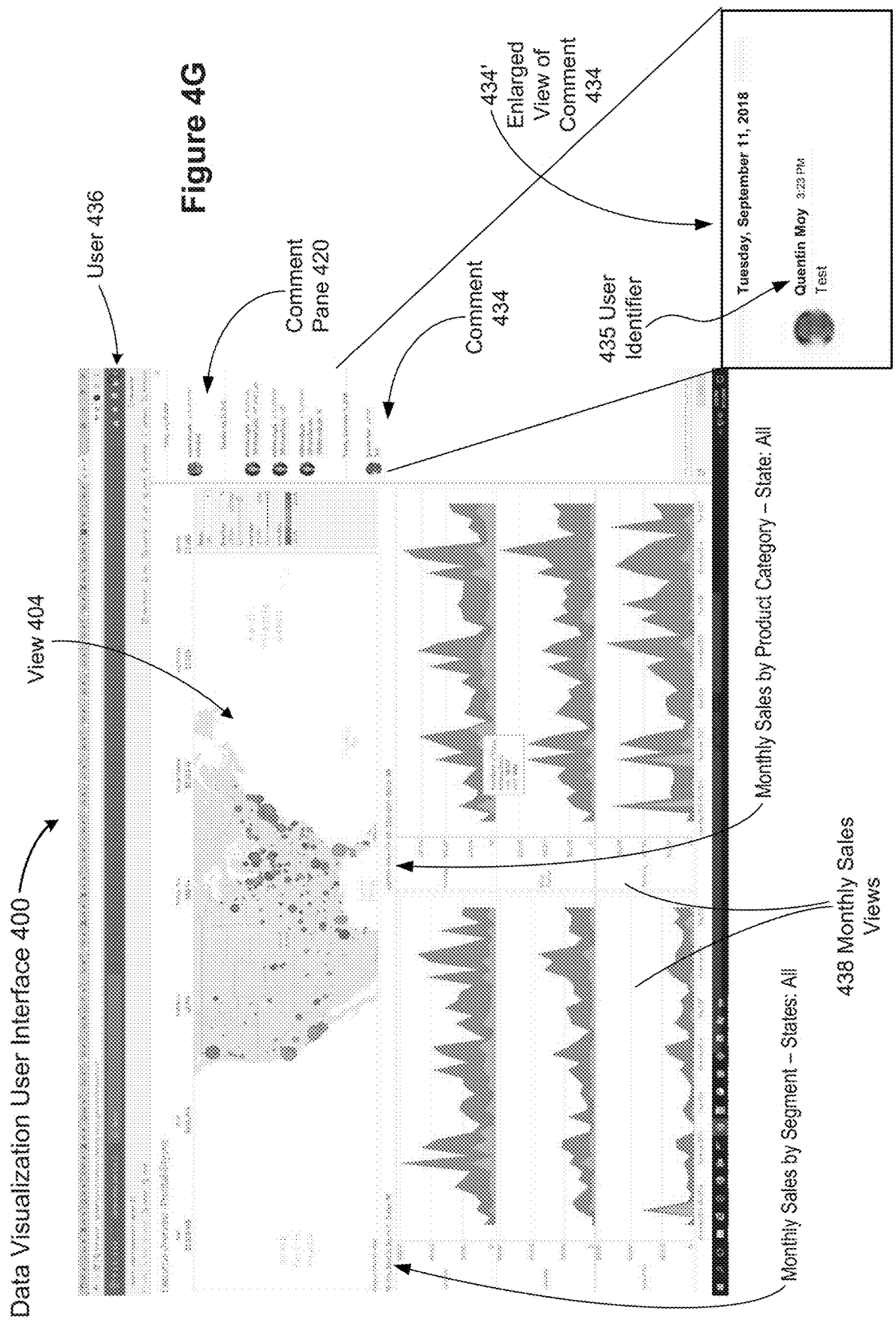
Figure 4H:
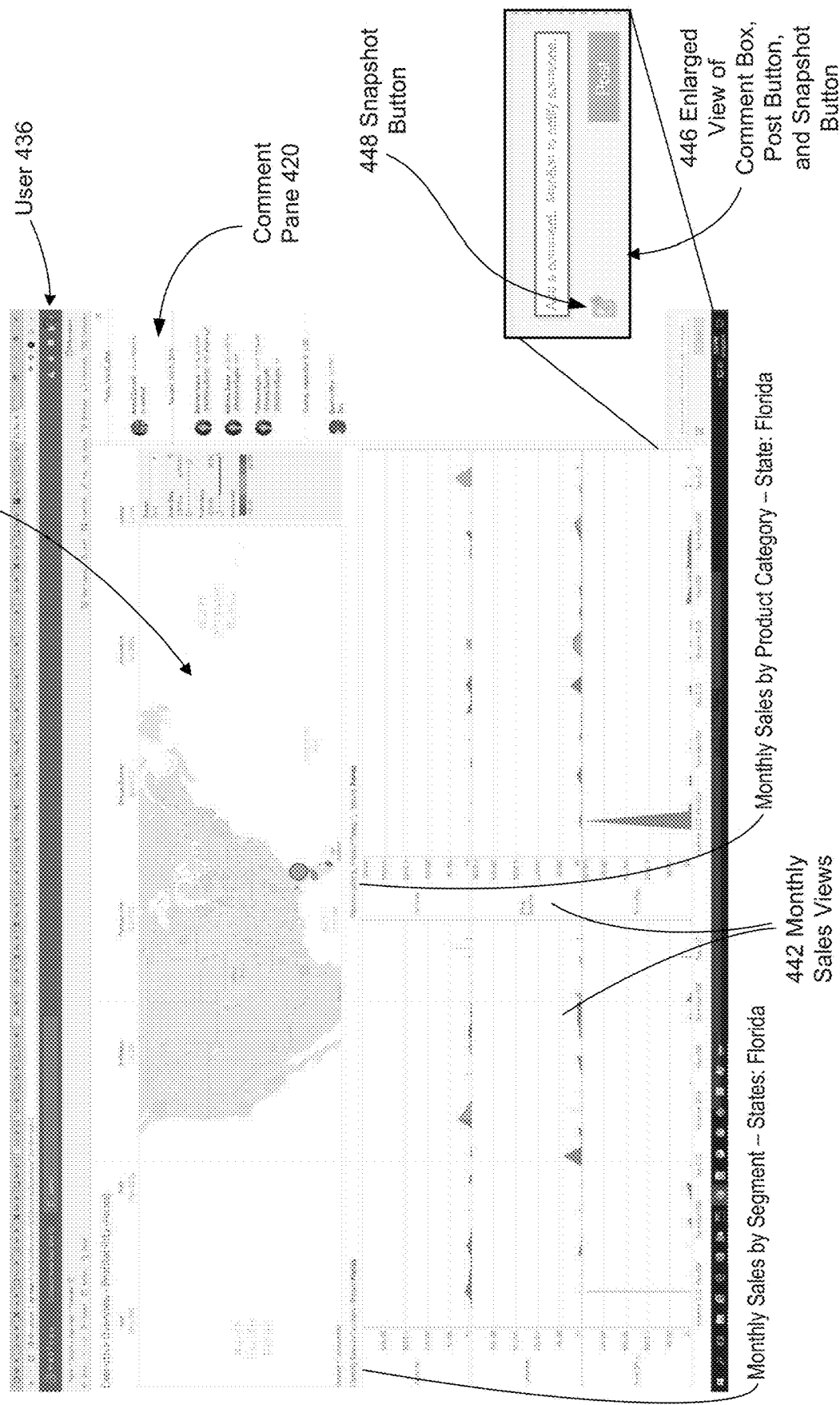
Figure 4I:
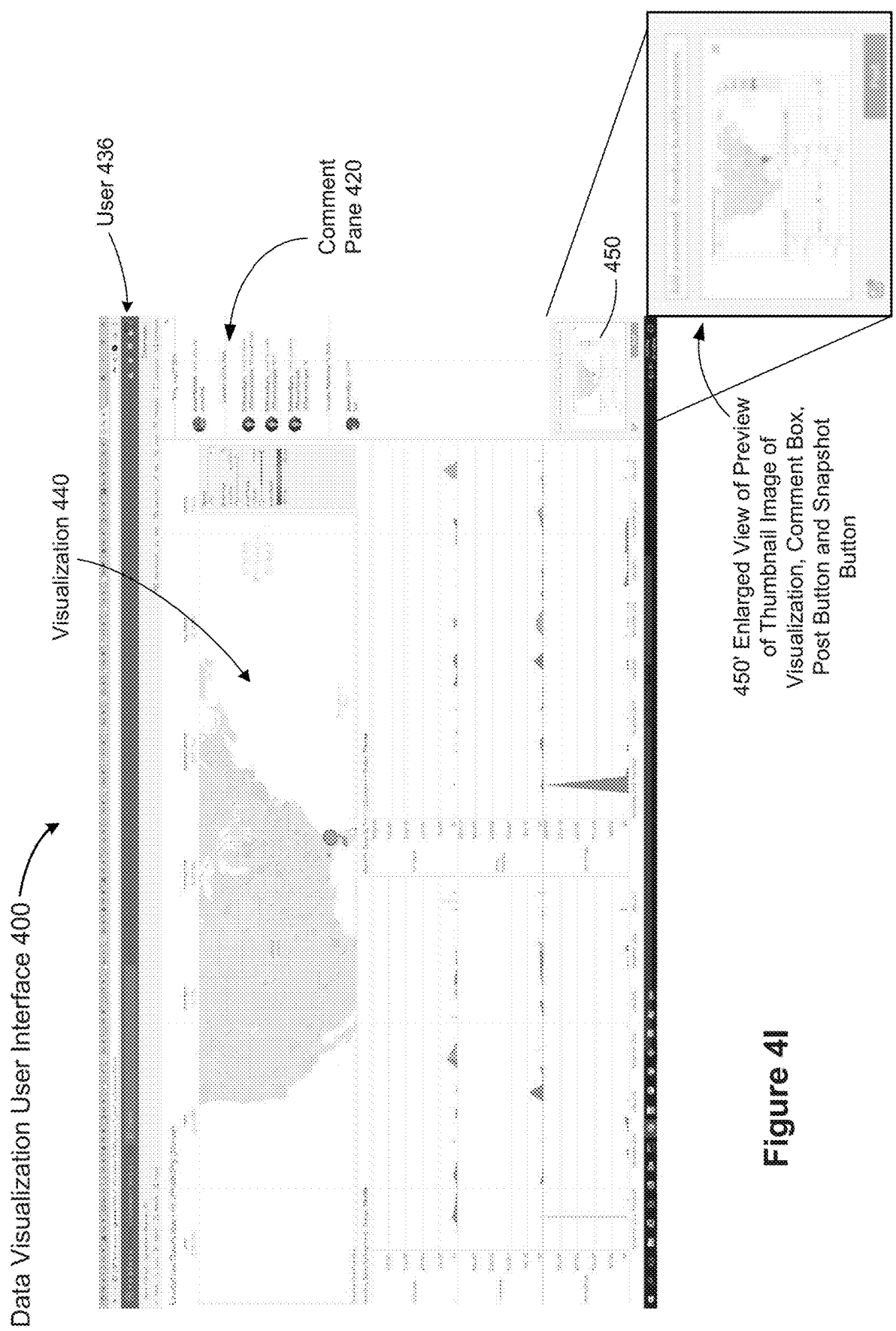
Figure 4J:
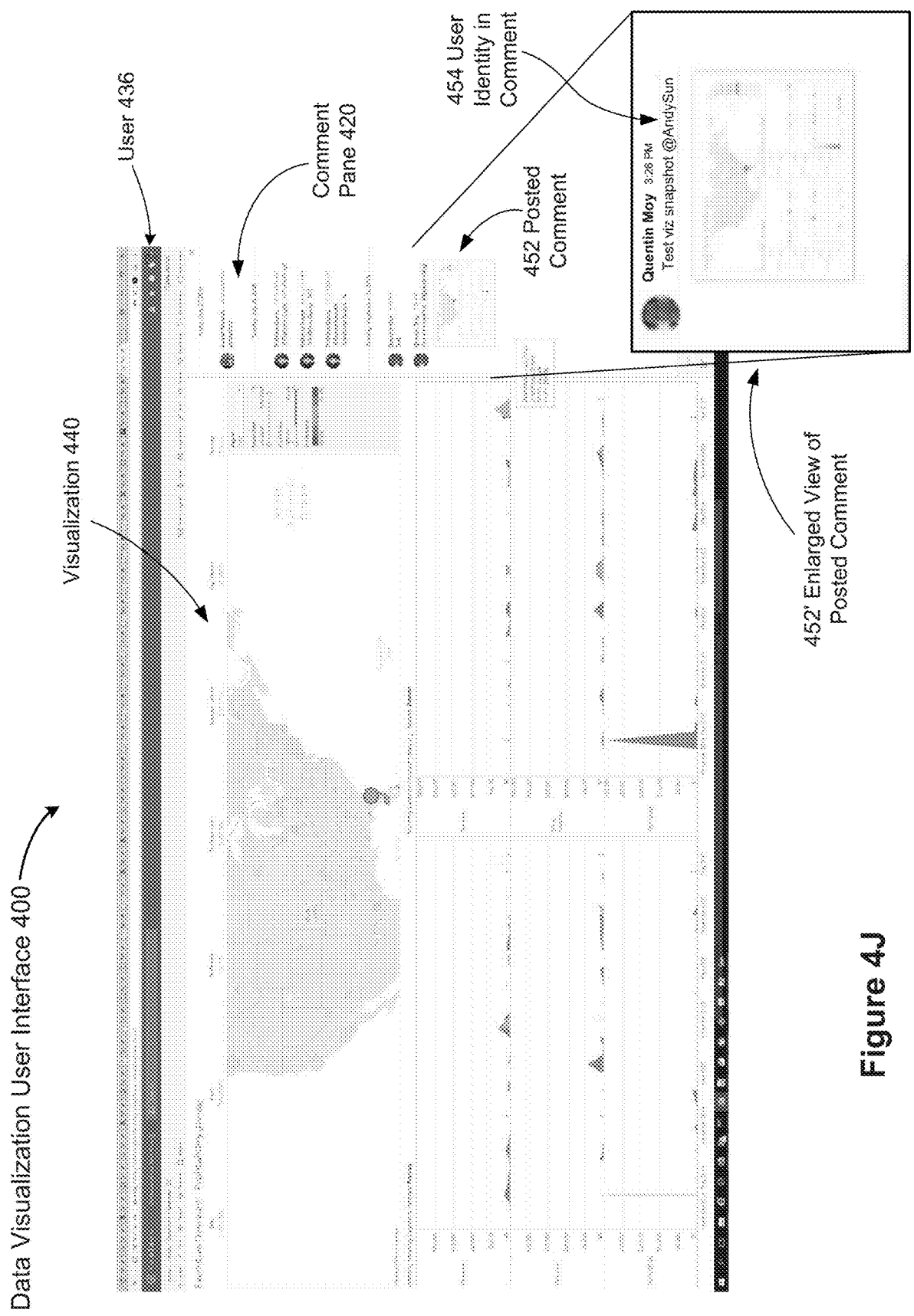
Figure 4K:
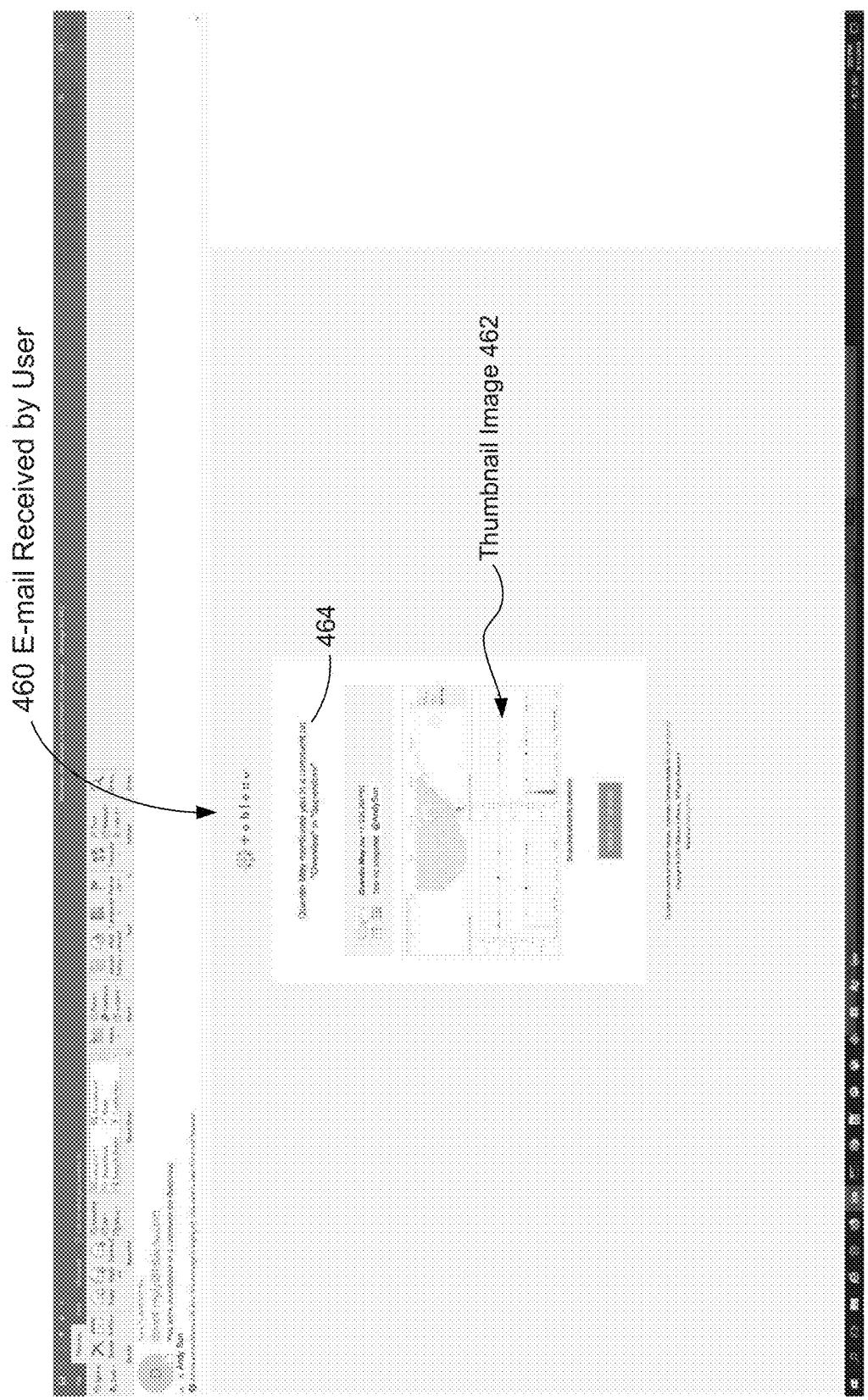
Figure 4L:
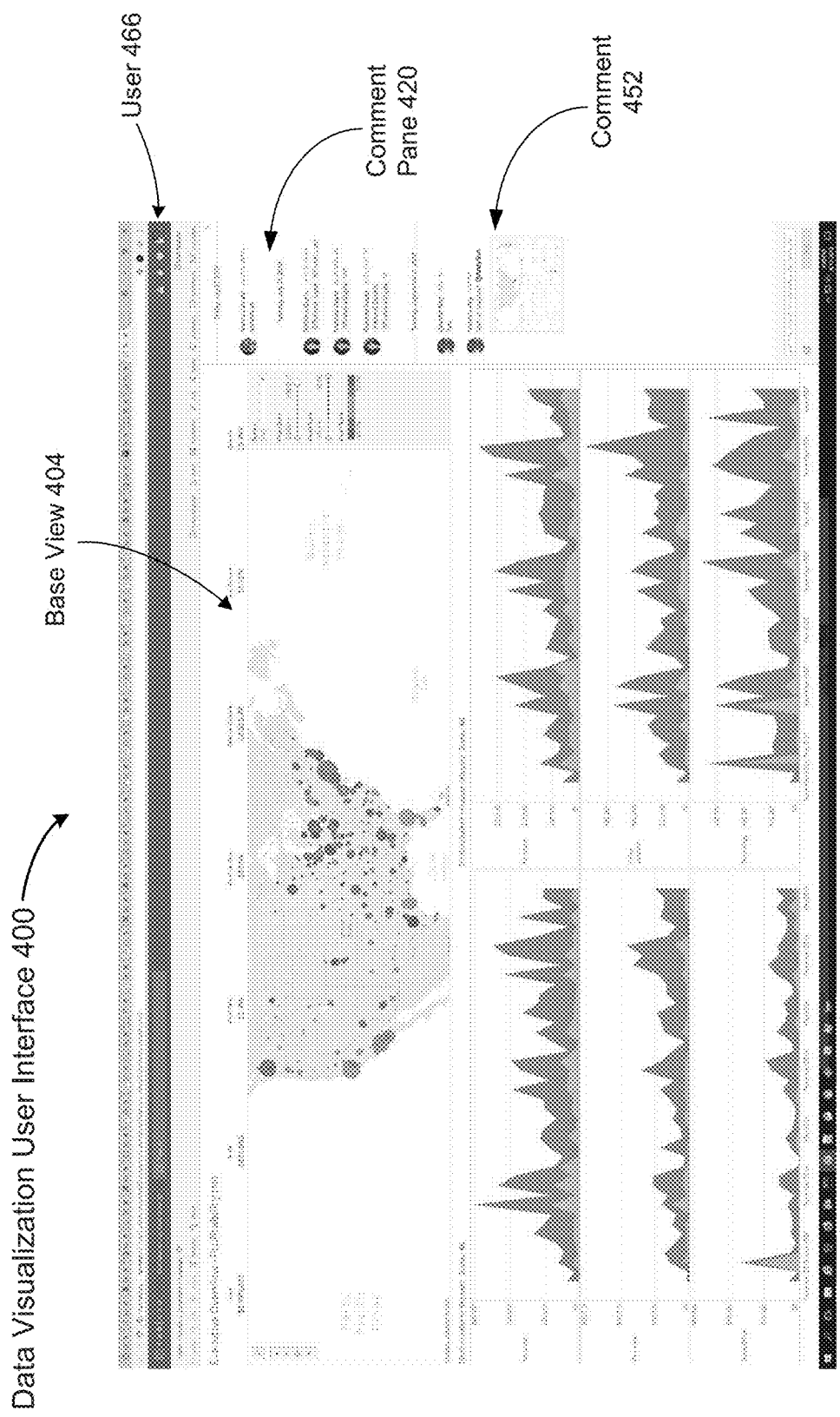
Figure 4M:
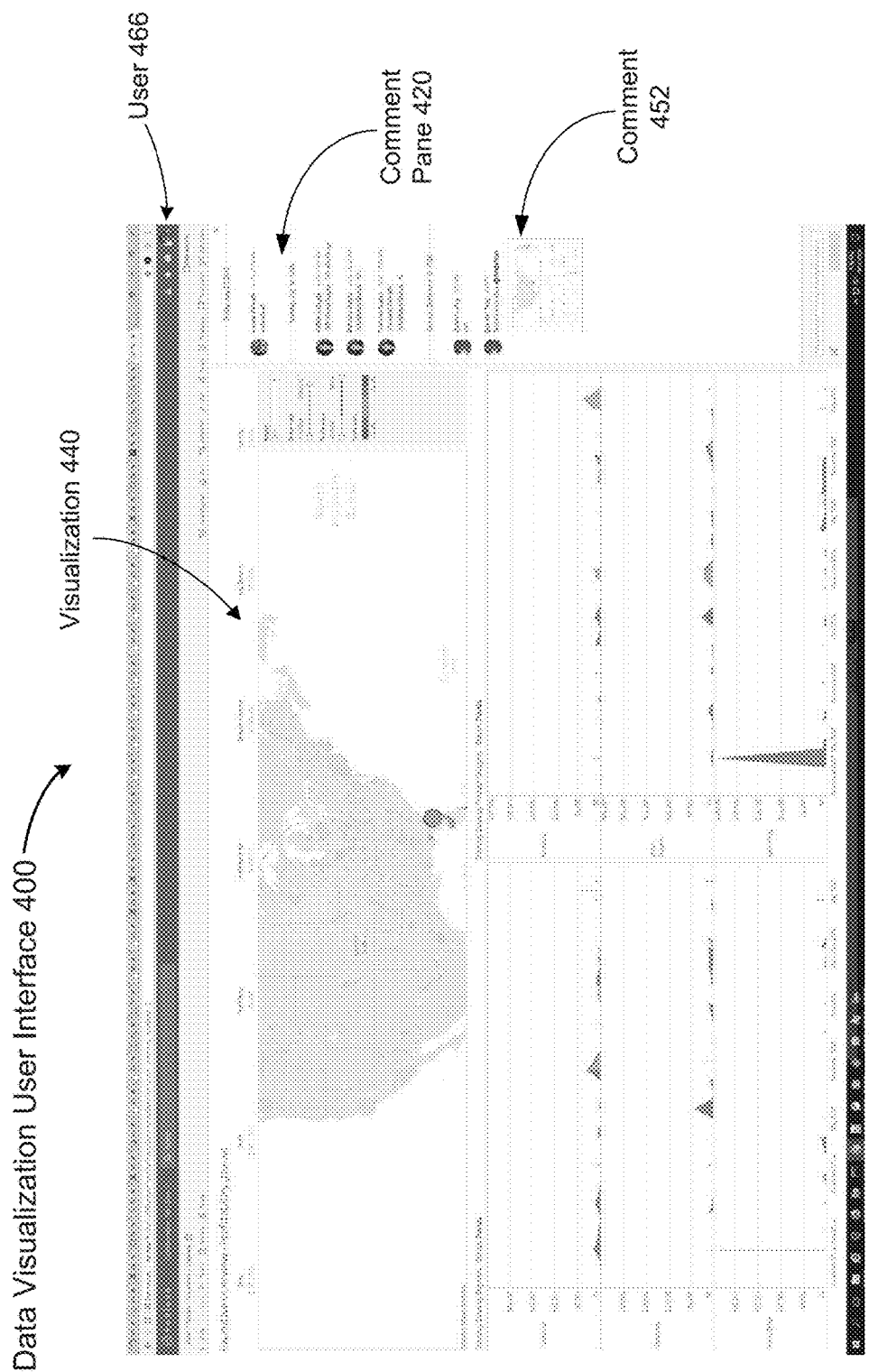
Figure 4O:
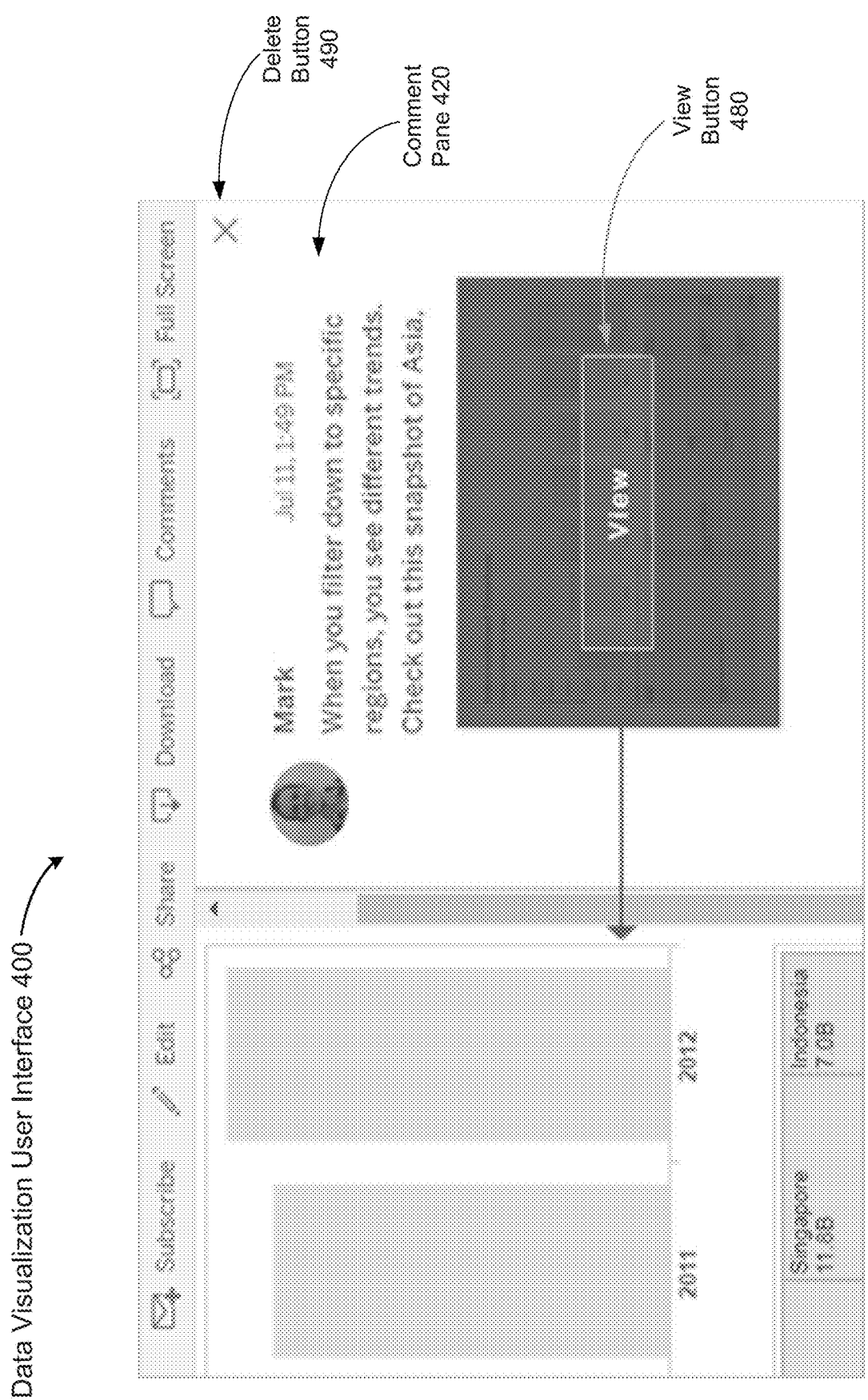

FIGS. 4A-4O illustrate the use of snapshots to establish context for comments, according to some implementations. FIG. 4A illustrates a view 404 of a data set shown without a comment pane. In this example, the view 404 is a dashboard with three separate (but related) data visualizations. As shown in FIG. 4A, the data visualization user interface 400 includes a comment button 402 when displaying view 404 (sometimes herein called a base view or a data visualization) of the data set. In some implementations, as shown in FIGS. 4B and 4C, the comment button 402 is part of a toolbar 410 that is displayed above a view (e.g., the view 404). FIG. 4D shows a data visualization with a comment pane 420, according to some implementations. In some implementations, the comment pane 420 is opened in response to a user selecting or clicking on the comments button 402. Notice also how the visualization (or view) 404 is shrunk to make space for the comment pane 420. Previously added comments are displayed in the comments pane 420. In some implementations, the comments are displayed with timestamps indicating when the comments were created. FIG. 4E shows an enlarged view of a data visualization user interface 400 with a comment pane 420. The display shows a first comment 426 from a first user and a second comment 428 from a second user 428. The display also shows the timestamps 422 and 424 corresponding to the time the respective comments were created. In some implementations, a comment box 430 is displayed where the user can add new comments. FIG. 4F shows an instance where the user has entered a comment (the string "test") in the comment box 430. FIG. 4F also includes an enlarged view 430' of the comment box 430. In some implementations, a user can click or select a "Post" button 434 to post the comment.

FIG. 4G shows the update to the comment pane 420 after creating the comment shown in FIG. 4F. The new comment 434 corresponds to the text entered in the comment box 430. Also shown in FIG. 4G is an enlarged view 434' of the comment 434. In some implementations, a picture or an identifier 435 corresponding to the user (e.g., the user 436) is displayed in the comment to indicate that the comment has been added by that user. The user 436 has not yet added a snapshot or context information for the comment. As indicated by the monthly sales views 438, FIG. 4G corresponds to the initial data visualization for the base view 404. The user has not yet made any change to the base view 404.

FIG. 4H illustrates an updated data visualization 440 as indicated by the monthly sales views 442 after the user (e.g., user 436) has modified the base view or the original visualization 404. In the example shown, the user 436 has filtered the base view 404, limiting the data to Florida. FIG. 4H also shows an enlarged view 446 of a comment box, a post button, and a snapshot button 448 that a user can press to create a thumbnail image of the data visualization (sometimes called a visualization snapshot or a snapshot), according to some implementations. FIG. 4I illustrates a visualization snapshot created by clicking (or selecting) the snapshot button 448. As shown, the interface 400 displays a preview 450 of the thumbnail image that will be posted with the comment. FIG. 4I also includes an enlarged view 450' of the preview 450.

FIG. 4J illustrates a posted comment 452 (and an enlarged view 452') in the comment pane 420 with a thumbnail image of the snapshot created by the user. The thumbnail image appears in the comment as shown. In this example, the new comment (shown in enlarged view 452') also indicates that the user 436 has added an identity 454 (e.g., an e-mail identifier or a twitter handle) to the comment text. In this case, it is an identifier for the user's colleague Andrew Sun (@AndySun). FIG. 4K is a screenshot of the email 460 received by Andrew Sun 466. The e-mail is generated because the identity 454 of the second user 466 was mentioned by the first user 436 in the comment 452. The system parses the comment to discover the identity of the second user 466 (Andrew Sun) and determines the e-mail recipient. In some implementations, the e-mail contains the thumbnail image 462 of the snapshot or data visualization added to comment 452. The email also provides a brief explanation 464 of why the user is receiving the message. FIG. 4L illustrates the display that results when the recipient clicks on the view in the e-mail link in FIG. 4K. In this example, the snapshot created by the first user 436 is not yet applied and only the base view 404 is displayed. However, the comment pane 420 is open and shows the last comment 452, which includes a thumbnail image.

FIG. 4M illustrates the change in the display when the second user 466 clicks or selects the thumbnail image in the comment 452. The snapshot corresponding to the data visualization indicated by the thumbnail image is applied to base view 404, and data visualization 440 is displayed as shown. At this point, the second user 466, with access to the data set, can continue exploring the data visualization 440 starting from the point where the first user 436 left off. According to some implementations, a link to the snapshot is embedded (e.g., as a hyperlink) in the thumbnail image as opposed to a static image (that cannot be selected). When a user selects the image, the snapshot is applied to the base view.

FIG. 4N illustrates that the second user 466 (Andrew Sun) has updated the data visualization 440 shown in FIG. 4M to obtain a modified data visualization 470. The second user 466 has also added a new comment 472. In this example, the second user 466 has created a second visualization snapshot and a thumbnail image of the modified data visualization 470 is added to the new comment 472. In some implementations, a user can select either of the data visualizations via the comments in the comment pane (e.g., via the thumbnail images in comment 452 and comment 472) to apply the corresponding snapshots to the base view 404. In some implementations, the user can go back and forth between the data visualizations and the base view by selecting the corresponding snapshot (via the thumbnail images in the comments) or the base view.

FIG. 4O illustrates how a user can filter a view and see a data snapshot in detail by hovering over the thumbnail image, and clicking the View button 480, according to some implementations. FIG. 4O also illustrates a delete button 490 that a user could use to delete a posted comment, according to some implementations. If a comment is unnecessary or inaccurate, a user can quickly delete it by just clicking the X (in the delete button 490) in the upper-right corner of a comment in the comment pane 420. In some implementations, a user can delete a comment if the user created it, if the user is the content owner, if the user is a project leader with an appropriate level of authority, or if the user is an administrator.

It is noted that, although two users were involved in the above illustrations, any number of users with access to the data set and/or the data visualizations can add comments, create snapshots, modify visualizations, select the thumbnail images in e-mails and/or comments, and view the corresponding visualizations. In some implementations, multiple users can interact with and add comments in a comment pane corresponding to a view (or a data visualization). In some implementations, several users can receive updated comments simultaneously. In some implementations, comments can be threaded and/or ordered according to the creation timestamps of the comments.

FIGS. 5A-5J provide a process flow 500 for a method of data visualization collaboration 502, according to some implementations. In accordance with some implementations, the method of data visualization collaboration 502 is performed (504) at a computer having a display, one or more processors, and memory storing one or more programs configured for execution by the one or more processors, as illustrated in FIGS. 2 and 3 above. The process receives (506) (e.g., via a communication interface 204), from a first user, a first comment that refers to a data visualization. The data visualization is based on a data set retrieved from a database using a set of one or more queries. The first comment includes i) first comment text 224, ii) a first thumbnail image 226 of the data visualization, and iii) a first visual specification 228 that specifies a plurality of parameters 108 to build the data visualization from the data set. In some implementations, the process stores the first visual specification in memory. In some implementations, the process stores the first comment in memory. In some implementations, the process stores the first thumbnail image in memory.

The process displays (508) a data visualization user interface 102, including a comment pane 420, for a second user. The comment pane displays the first comment text 224 and the first thumbnail image 226. Some implementations display (508) a graphical user interface 102 (sometimes called a data visualization user interface) on a computer display 208, where the graphical user interface includes a schema information region 110 and a data visualization region 112, as illustrated in FIG. 1. The schema information region 110 includes multiple field names, according to some implementations. Each field name is associated with a data field from the specified databases. In some implementations, the data visualization region 112 includes a plurality of shelf regions (e.g., shelf regions 120, 122, 124, and 126) that determine characteristics of the data visualization. Each shelf region is configured to receive user placement of one or more of the field names from the schema information region 110.

The process detects (510) user input (e.g., via the input device 210) from the second user to select the first thumbnail image 226. In response (512) to the detected user input: the process generates (514) (e.g., by the data visualization application 222) the data visualization according to the first visual specification 228, including retrieving (e.g., using data retrieval module 326) a second data set from the database (e.g., from the data sources 106) according to the set of one or more queries. The process displays (516) (e.g., using the data visualization application 222) the data visualization in the data visualization user interface. In some instances, the second data set and the first data set are (538) the same. In some instances, the second data set and the first data set are (548) different. For example, the data set is retrieved from a live database, and the live data has changed.

The process receives (518) (e.g., via input device 210) one or more user inputs (e.g., to apply filters, to scroll, or to highlight data marks) from the second user modifying the displayed data visualization. In some implementations, the process stores the modified data visualization to memory (e.g., as a visual specification 228 and/or as updates visualization parameters 108).

The process receives (520) user input (e.g., via the input device 210) in the comment pane 420, from the second user, specifying second comment text 224 for a second comment that refers to the data visualization. In response (522) to receiving the user input in the comment pane, from the second user, the process captures (524) (e.g., using data visualization application 222) a second thumbnail image of the modified data visualization, and saves (526) a second visual specification that specifies parameters to build the modified data visualization from the second data set. In some implementations, the process saves the second comment in memory, saves the second thumbnail image in memory, and/or saves the second visual specification in memory. As illustrated in FIG. 5D, the process transmits (536) (e.g., using the communication interface 204) the second comment text, the second thumbnail image, and the second visual specification to the first user.

Figure 5A:
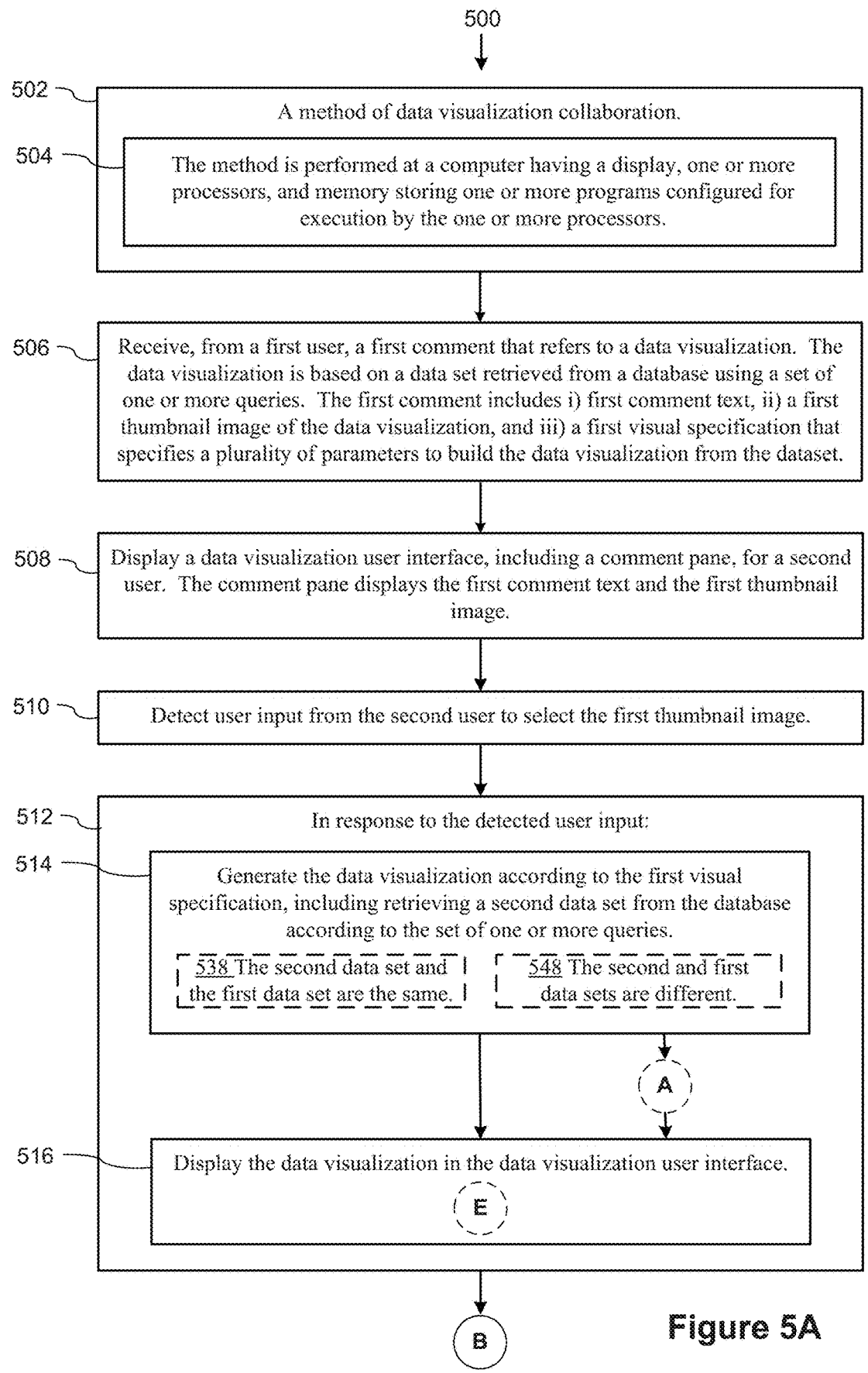
FIGS. 5A-5J provide a process flow for a method of data visualization collaboration, according to some implementations.
Figure 5B:
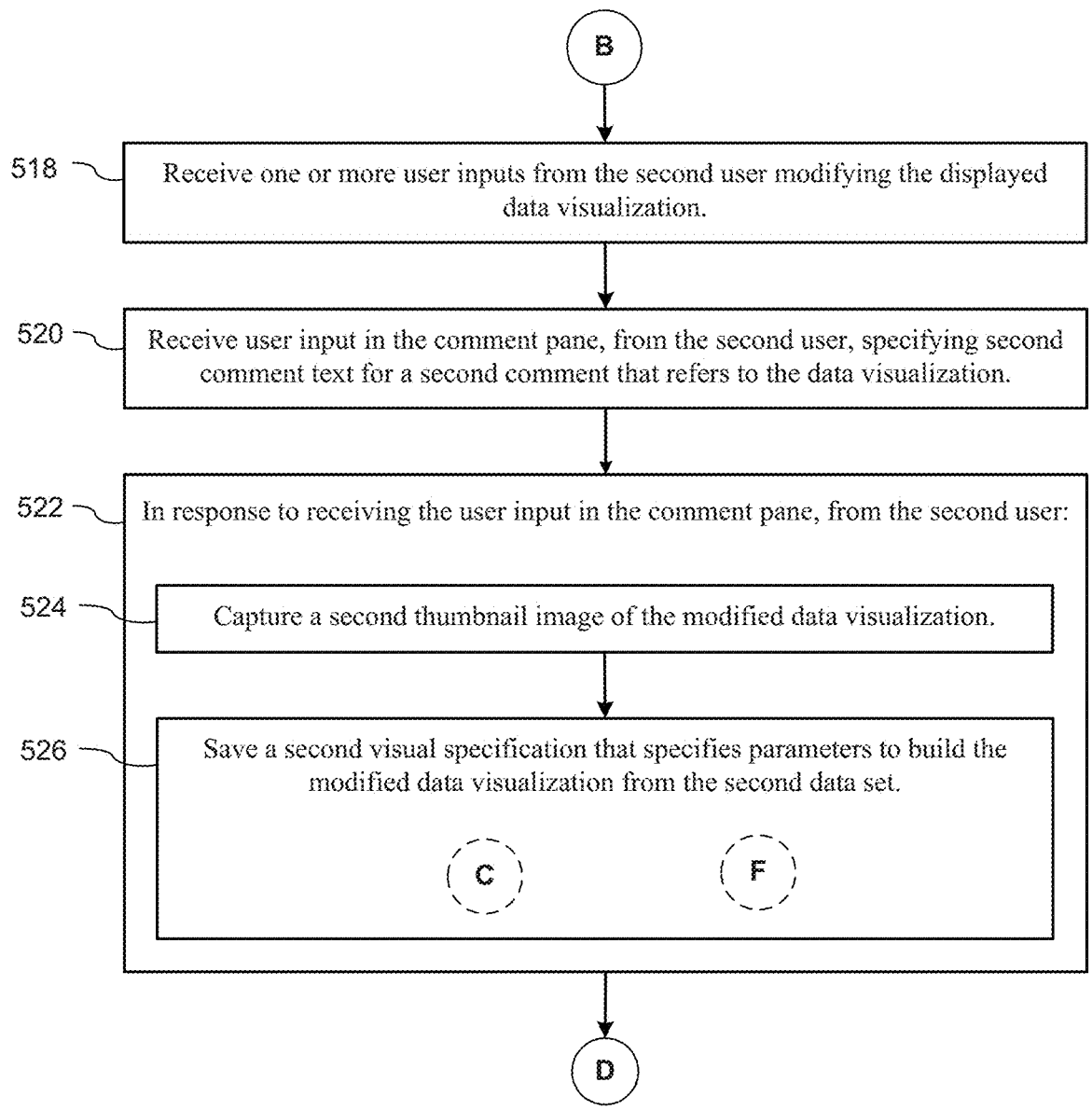
Figure 5C:
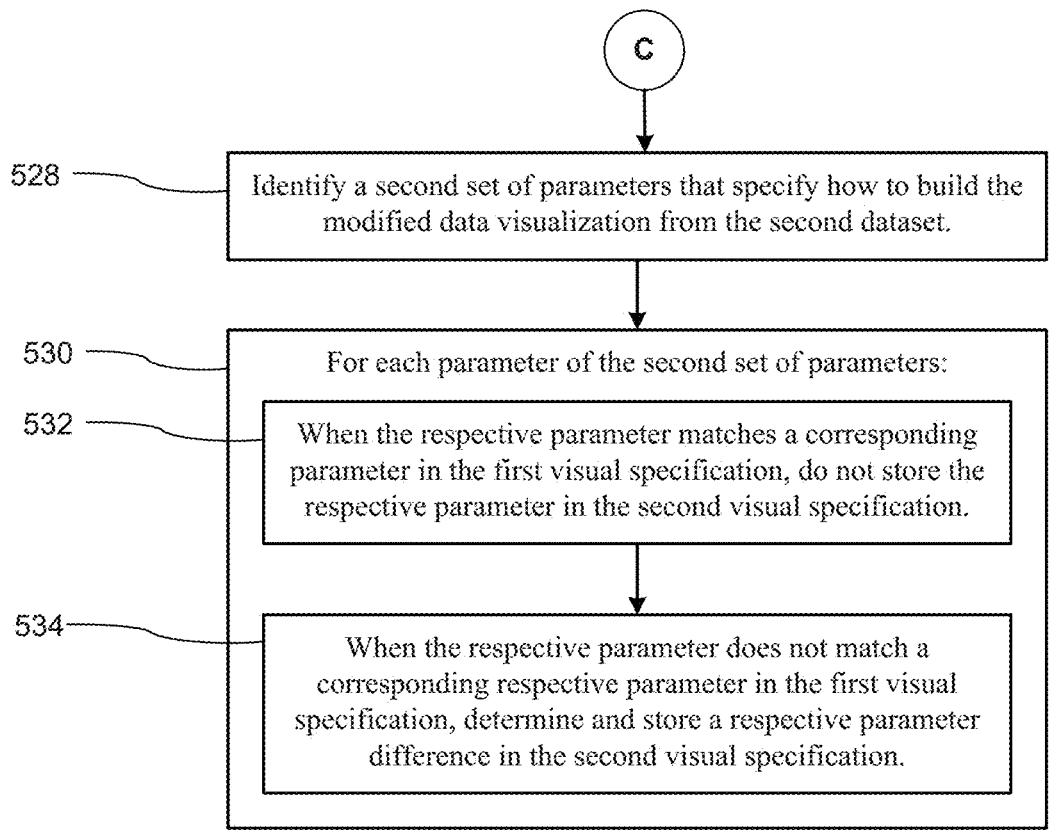
Figure 5D:
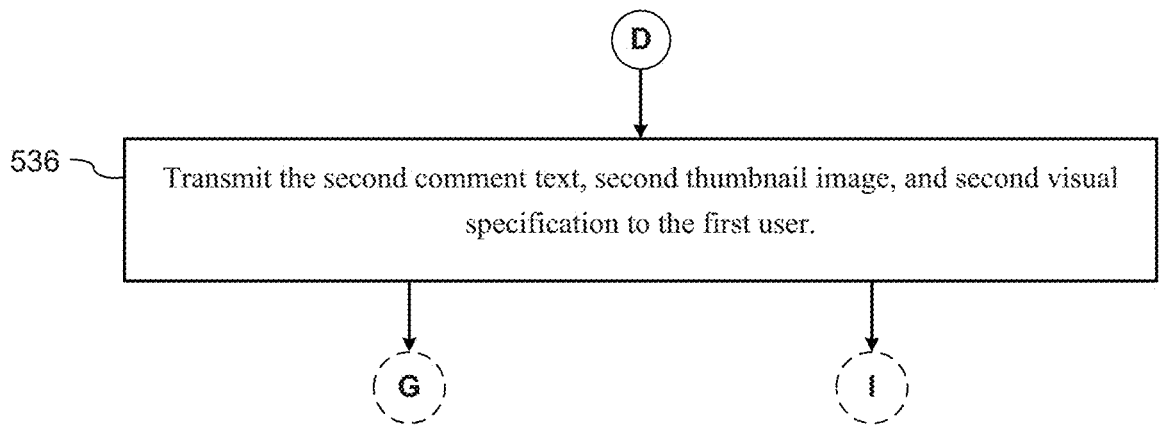

Referring now to FIG. 5C, in some implementations, the process saves the second visual specification by identifying (528) a second set of parameters that specify how to build the modified data visualization from the second dataset, and for each parameter of the second set of parameters (530): when the respective parameter matches a corresponding parameter in the first visual specification, not storing (532) the respective parameter in the second visual specification 228; and when the respective parameter does not match a corresponding respective parameter in the first visual specification, determining and storing (534) (e.g., in the visual specifications 228) a respective parameter difference in the second visual specification. In some implementations, the first set of parameters 108 and the second set of parameters 108 are retrieved from memory. In some implementations, the process examines the visual specifications 228 to determine the first set of visualization parameters and the second set of visualization parameters.

Figure 5E:
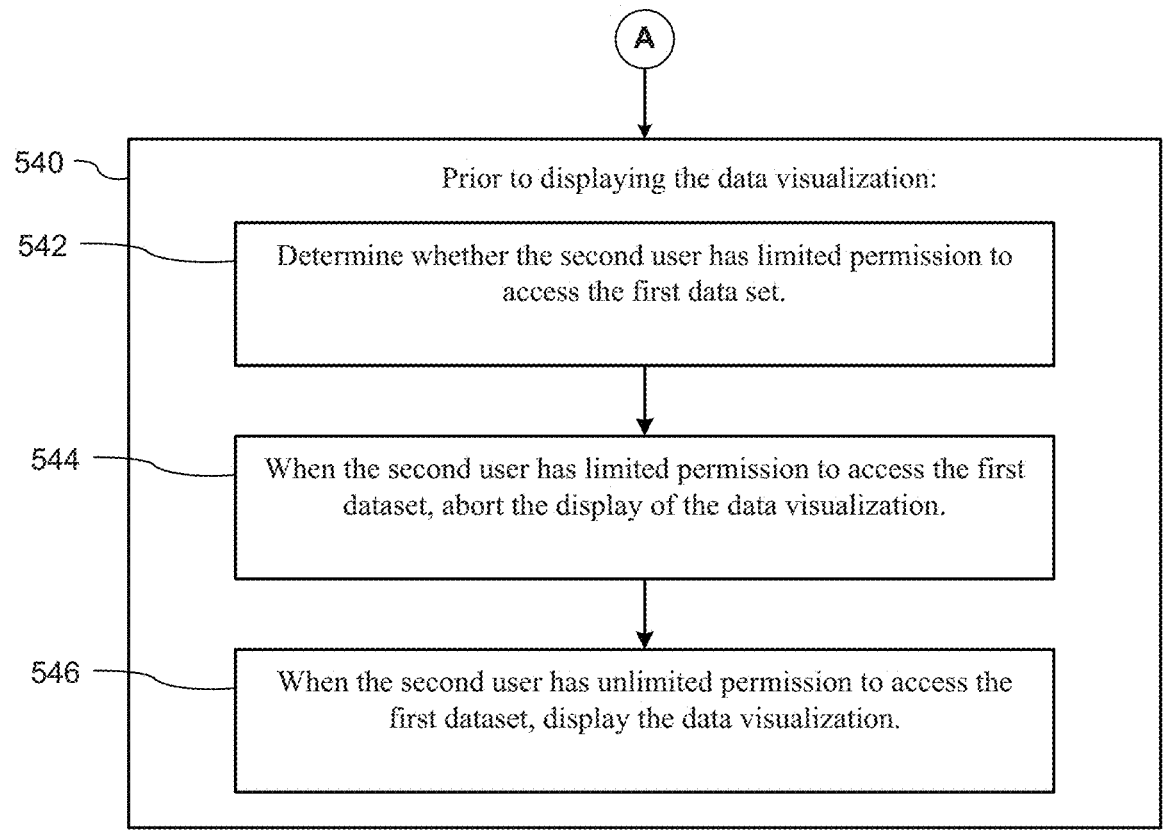

As illustrated in FIG. 5E, in some implementations, prior to displaying the data visualization (540), the process determines (542) (e.g., using a module in the data visualization application 222) whether the second user has limited permission to access the first data set. When the second user has limited permission to access the first dataset, the process aborts (544) the display of the data visualization. When the second user has unlimited permission to access the first data set, the application 222 displays (546) the data visualization.

Figure 5F:
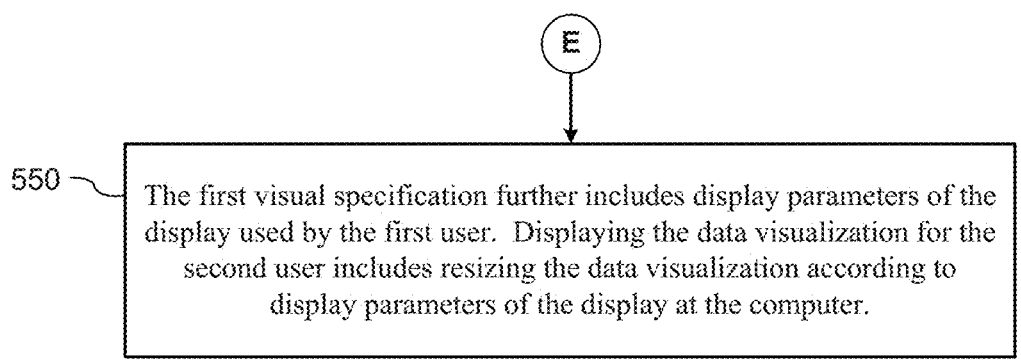

As illustrated in FIG. 5F, in some implementations, the first visual specification includes display parameters of the display used by the first user. Displaying the data visualization for the second user includes resizing (550) the data visualization according to display parameters of the display at the computer. For example, in some implementations, a thumbnail image in a comment is displayed with an aspect ratio that is suitable for a viewer's device, but when the snapshot is used for data visualization, the data visualization either is tailored to the viewer's device or retains the display parameters of the device of the author of the comment.

Figure 5G:
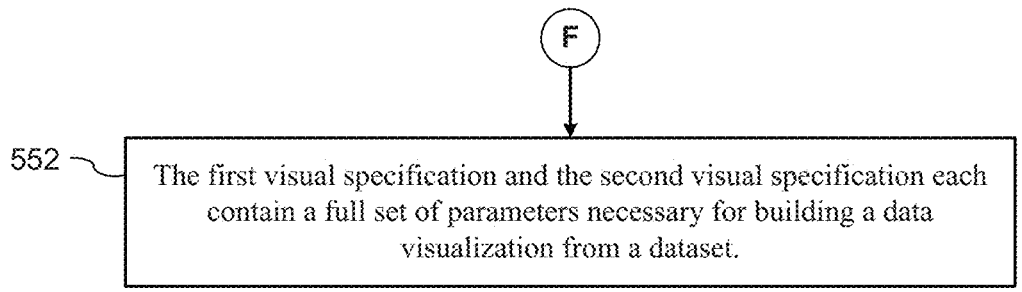

As illustrated in FIG. 5G, in some implementations, the first visual specification and the second visual specification each contains (552) a full set of parameters (rather than as a delta from a base view) necessary for building (from scratch) a data visualization from a data set.

Figure 5H:
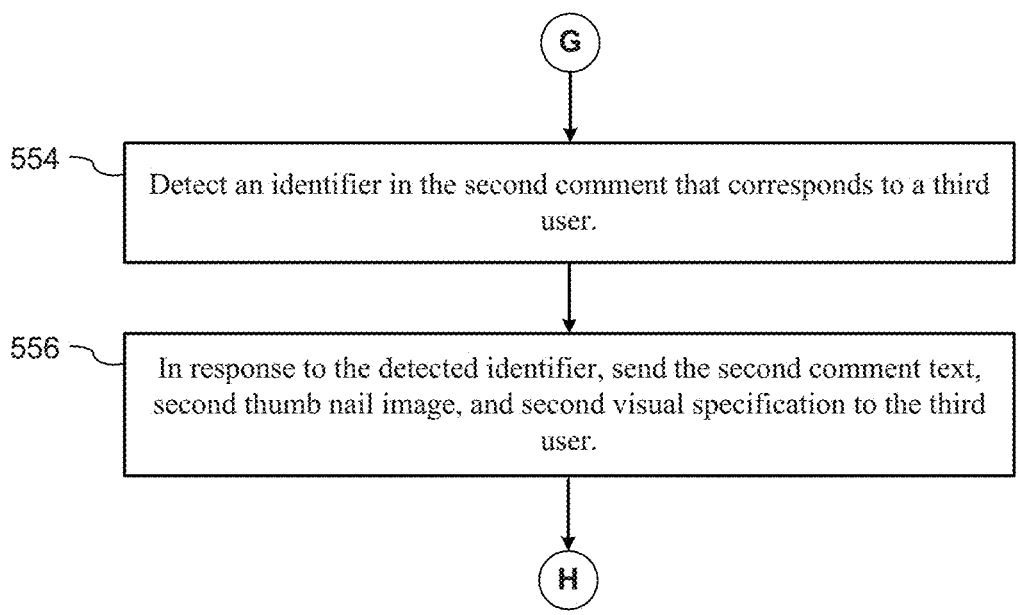

As illustrated in FIG. 5H, in some implementations, the process further detects (554) an identifier in the second comment that corresponds to a third user. In response to the detected identifier, the process sends (556) (e.g., via an e-mail, using a module in the data visualization application 222) the second comment text, the second thumbnail image, and the second visual specification to the third user.

Figure 5I:
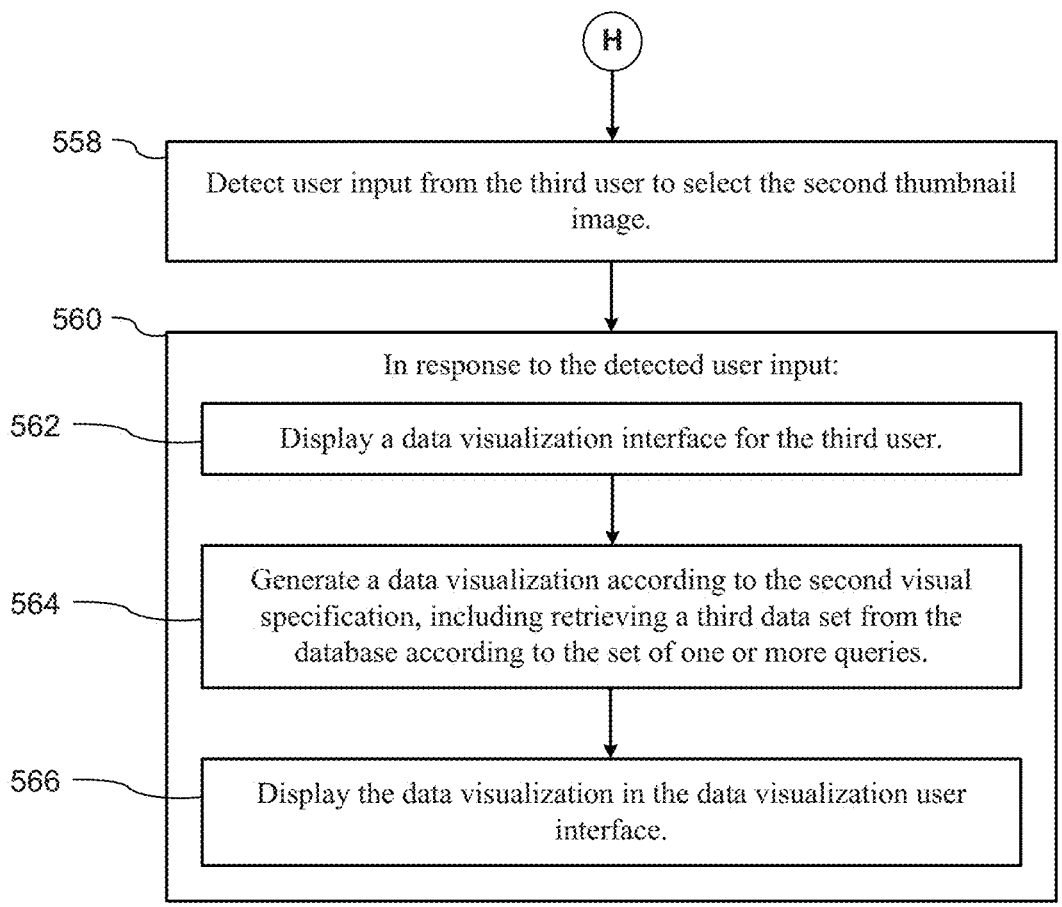

As illustrated in FIG. 5I, in some implementations, the process detects (558) user input from the third user to select the second thumbnail image. In response (560) to the detected user input, the process displays (562) a data visualization interface for the third user, generates (564) a data visualization according to the second visual specification, including retrieving a third data set from the database according to the set of one or more queries, and displays (566) the data visualization in the data visualization user interface.

Figure 5J:
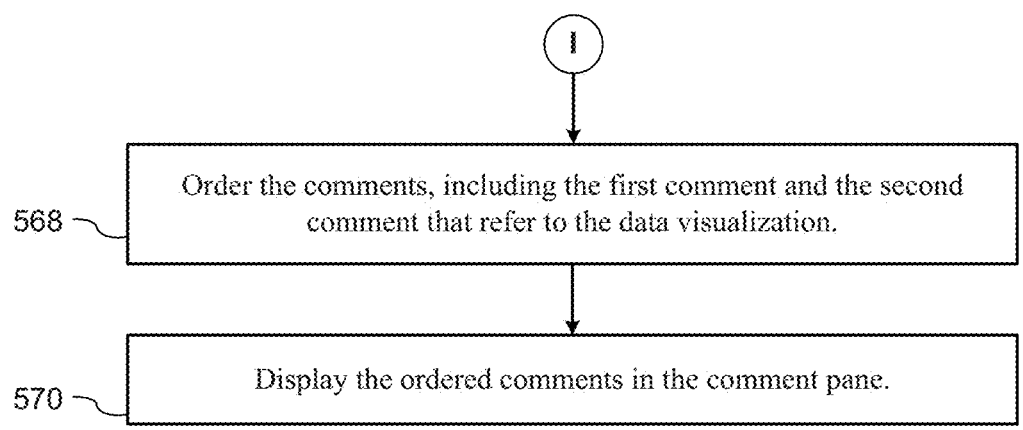

As illustrated in FIG. 5J, in some implementations, the process further orders (568) comments (e.g., using creation timestamps) including the first comment and the second comment that refer to the data visualization, and displays (570) the ordered comments in the comment pane.

Customized Views as Visualization Snapshots

Some implementations use customized views for visualization snapshots. Customized views are views saved by a user after applying a set of filters to an initial (base) view (sometimes called a data visualization) of a data set. As previously discussed, users can comment on a visualization or dashboard in a certain state (e.g., after applying selection, highlighting, or filtering), and other users can navigate through the comments. In some implementations, navigation of the comments places the visualization in the same state (sometimes herein called a snapshot) as when the comment was made.

In some implementations, visualization snapshots leverage customized views as further described below. In some implementations, customized views are further optimized and adapted to improve the user experience by refreshing a display interface when a user selects a snapshot (e.g., by selecting a thumbnail image). In some implementations, an image of a data visualization is generated and exported (e.g., as a PNG file). Some implementations generate and re-apply a saved state of a data visualization. Some implementations create an overlaying iFrame to generate a new session based on a customized view. In some implementations, the iFrame is reloaded (e.g., because a URL change is required) each time a user navigates to a new view. Some implementations navigate to a customized view of the current dashboard without requiring a URL change, and the user interface is not torn down and rebuilt from scratch. Some implementations create the current visualization that the user is viewing and generate a new session based on a customized view. Some implementations detect when a customized view used as a snapshot should be invalidated. For example, when a customized view is left in an inconsistent state by a user, selection of the customized view by another user would trigger invalidation of the customized view and/or terminating the display of the customized view. In some implementations, customized views are stored in an object-relational database (e.g., a Postgres® database).

In some implementations, customized views (e.g., entries in a Postgres® database) are tagged with security information so that some users are restricted from viewing the customized views (e.g., the snapshots in some comments). Some implementations mark a customized view (e.g., with an unused user identifier) for private viewing restricted to a creator, an owner, or an administrator. In some implementations, when a user switches between comments (e.g., with thumbnail images of snapshots), rather than reloading and/or refreshing the entire display interface, the comment pane displaying the different comments is left intact (e.g., the relative position of the comments in the display is left undisturbed). In some implementations, some features, such as view formatting or parsing, are stripped (i.e., are absent) from customized views to avoid complexity and to improve performance. In some implementations, a workbook's undo history is used as a delta for the workbook. For example, the most recent user state is obtained by reapplying the undo history to the original workbook that the user started with. Some implementations use workbook "diffing" (or differencing) to get delta workbooks that capture changes that happened in the entire workbook beyond what customized views capture, and provide for improved reconstruction time. Some implementations retrieve the saved state (e.g., customized views) from a relational database, and trigger a command (e.g., a Tableau "tabsrv" command) with the data as a parameter.

Figure 6A:
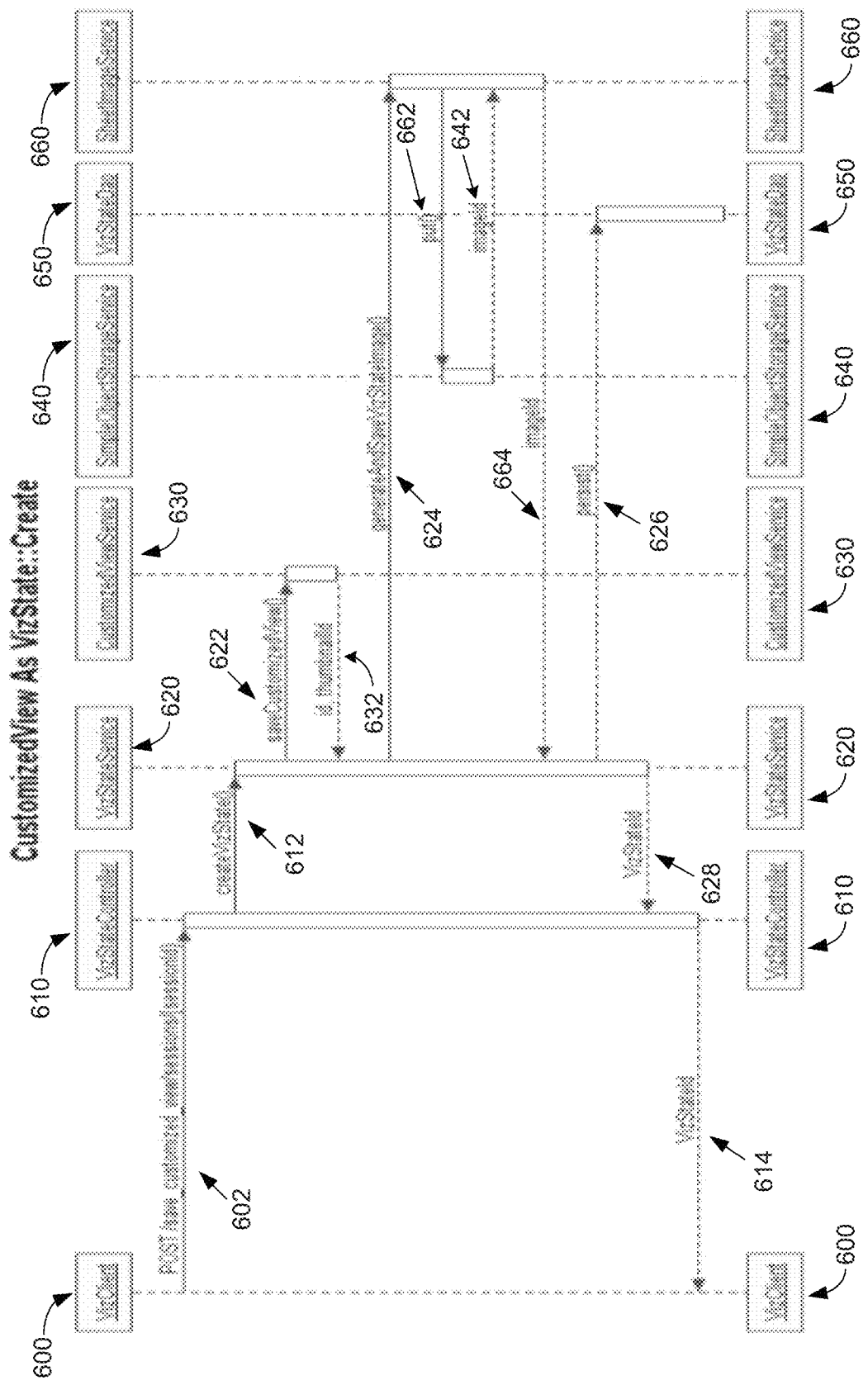
FIGS. 6A and 6B illustrate sequence diagrams for implementing visualization snapshots using customized views, according to some implementations.
Figure 6B:
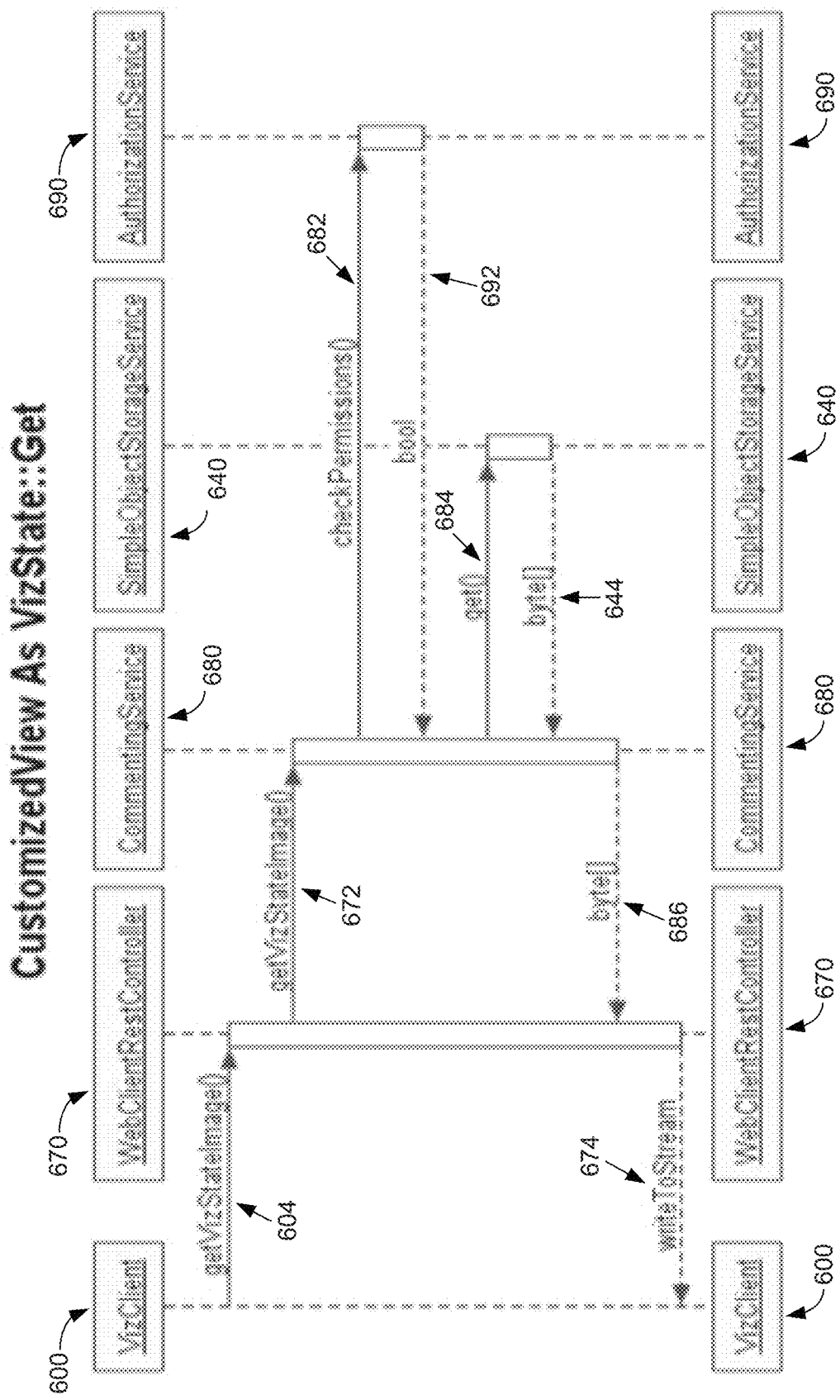

FIGS. 6A and 6B provide sequence diagrams for implementing visualization snapshots using customized views, according to some implementations. FIG. 6A illustrates the creation of a visualization state or a snapshot based on a customized view, according to some implementations. In some implementations, a visualization client (600) responds to a user request to post a comment for a data visualization by sending a message 602 to a visualization state controller 610 to post the comment and save a customized view. In some implementations, the message 602 also includes information on current sessions and a session identifier for the session that originated the user request. The visualization state controller 610, in response, sends a message 612 to create a visualization state to a visualization state service (620), according to some implementations. The visualization state service 620 receives message 612 and responds by sending a message 622 to a customized view service 630 to save a customized view, according to some implementations. The customized view service 630 saves the customized view and returns (or sends) a message 632 back to the visualization state service 620 with information identifying the customized view, and a thumbnail image identifier, according to some implementations. The visualization state service, once it receives the message 632 with the thumb nail identifier, sends a message 624 to a sheet image service 660, according to some implementations. The sheet image service 660 in turn sends a put signal or message 662 to a simple object storage service 640 which responds with a message 642 indicating an image identifier of the thumbnail image, according to some implementations. The sheet image service 660 returns this image identifier via a message 664 back to the visualization state service 620, and that service registers 626 the thumbnail image and the visualization state or the customized view to persist the data. The visualization state service 620 also returns the visualization state identifier 628 back to the visualization state controller 610 which in turn returns that identifier back to the visualization client 600, according to some implementations.

FIG. 6B illustrates the retrieval (getting) of a visualization state, according to some implementations. In some implementations, the visualization client 600 initiates a get visualization state image request 604 to a web client REST controller 670. The web client REST controller 670 passes this request as a message 672 to a commenting service 680, according to some implementations. In response, the commenting service 680 sends a message 682 to an authorization service 690 to check permissions, according to some implementations. Assuming the user has permissions to view the visualization state, the authorization service 690 responds with a grant access message 692. If the user does not have permission, the authorization service 690 responds with a decline request message (a false Boolean) in the message 692, and the rest of the system (the commenting service 680 followed by the web client REST controller 670 followed by the visualization client 600) cancels or aborts getting the visualization state. Returning to the case when the user has permission, the commenting service sends (one or more) messages 684 to the simple object storage service 640 (described above in reference to FIG. 6A) to get the required information related to the visualization state. Once the simple object storage service 640 returns the information 644, the commenting service forwards (686) that information to the web client REST controller 670, according to some implementations. The REST controller 670 writes (674) the information to an output stream that is consumed by the visualization client 600, according to some implementations.

Data Security

When multiple users converse regarding a data visualization, the comments that a user adds or a snapshot the user adds to a comment could inadvertently provide sensitive information to another user who lacks access permission for that information. Moreover, the owner or the creator of the comment or an accompanying snapshot could lack relevant information to add access restrictions for viewers of the comment. Even so, a user could mark a specific conversation or comment private and include one or more other users to the conversation, and some implementations then enforce the user's preference and only lets those identified other users view the data visualization snapshots enclosed in the comment. In some implementations, commenting on a workbook is disabled by default, and enabled by a user who has authored the workbook. In some implementations, when the workbook has user filters applied (e.g., the current visualization is not a base view), the commenting feature is turned off by default. In some implementations, comments with snapshots or the snapshots within those comments are displayed only to those users who have equal or less restrictive access to the filters used by the author of the comment. In some implementations, the thumbnail image of a data visualization is obfuscated so as to not disclose sensitive information to those with more restrictive access than the author of the comment or the workbook.

Because comments pertain to a specific data visualization, the displayed comments in the comment pane are only those for the current sheet of the current workbook.

As illustrated in FIGS. 4J and 4K, a user can trigger sending a message to another user by embedding a user identifier in the comment text of a comment. However, even without a message, a second user can open up the comment pane from within the data visualization user interface 102 and see any comments for the currently selected sheet.

In some implementations, every time a comment is created, a new snapshot (e.g., visual specification) is created. This allows other users to recreate the data visualization as seen by the first user. In other implementations, creating snapshots is independent of creating comments. For example, a user may want to store a snapshot to keep track of the current condition and return to it later. In some implementations, if a user has created a snapshot, it is automatically included with any comments that are created (e.g., when a comment is created, automatically include the most recent snapshot). In some implementations, snapshots are added to comments based on user selection. In some implementations, comments do not inherently include snapshots.

A "snapshot" stores information about a data visualization. In some implementations, the snapshot includes all of the information necessary needed to build the data visualization from scratch (a full visual specification). In some implementations, the base data visualization (or dashboard) has all of the parameters necessary to construct the visualization, so a snapshot stores only those parameters that change how the data visualization is displayed, such as filters, scrolling to different parts of the data visualization, highlighting specific data marks, or changing how the data marks are sorted. In this case, a snapshot is basically the delta between what the view looks like at the time it was taken versus what the base data visualization looks like. When there are multiple comments, each with its own snapshot, each of the snapshots is a difference from the based data visualization.

Within a given data visualization, only the comments for that data visualization are displayed. They are typically displayed in chronological (or reverse chronological) order in the comment pane.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations.

However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of data visualization collaboration, comprising:
   at computer having a display, one or more processors, and memory storing one or more programs configured for execution by the one or more processors:
   displaying a data visualization user interface, including a comment pane, for a second user, the comment pane displaying a first comment, from a first user, the first comment including (i) first comment text, (ii) a first thumbnail image of a data visualization, and (iii) a first visual specification that includes a first set of parameters that specify how to build a data visualization, wherein the first set of parameters (i) specifies one or more data sources, (ii) specifies one or more data fields from the one or more data sources, and (iii) specifies associations between the one of more data fields and visual properties of the data visualization;
   in response to detecting a first user input from the second user to select the first thumbnail image:
     retrieving a result set from a database according to a set of one or more database queries determined from the first visual specification;
     generating the data visualization according to (i) the first visual specification and (ii) the result set; and
     displaying the data visualization in the data visualization user interface;
   receiving one or more user inputs from the second user modifying the displayed data visualization;
   in response to receiving a second user input in the comment pane, from the second user, specifying second comment text for a second comment that refers to the modified data visualization:
     capturing a second thumbnail image of the modified data visualization; and
     saving a second visual specification that specifies a second set of parameters to build the modified data visualization from the result set, wherein the second set of parameters is different from the first set of parameters; and
     transmitting the second comment text, the second thumbnail image, and the second visual specification to the first user.

2. The method of claim 1, wherein saving the second visual specification comprises:
   identifying the second set of parameters that specify how to build the modified data visualization from the dataset; and
   for each parameter of the second set of parameters:
     when the respective parameter matches a corresponding parameter in the first visual specification, not storing the respective parameter in the second visual specification; and
     when the respective parameter does not match a corresponding respective parameter in the first visual specification, determining and storing a respective parameter difference in the second visual specification.

3. The method of claim 1, further comprising:
   prior to displaying the data visualization:
   determining whether the second user has limited permission to access the dataset;
   in accordance with a determination that the second user has limited permission to access the dataset, aborting the display of the data visualization; and
   in accordance with a determination that the second user has unlimited permission to access the dataset, displaying the data visualization.

4. The method of claim 1, wherein the first visual specification further includes display parameters of the display used by the first user, and wherein displaying the data visualization for the second user further includes resizing the data visualization according to display parameters of the display at the computer.

5. The method of claim 1, wherein the first visual specification and the second visual specification each contain a full set of parameters necessary for building a data visualization from a data set.

6. The method of claim 1, further comprising:
   detecting an identifier in the second comment that corresponds to a third user; and
   in response to the detected identifier, sending the second comment text, second thumbnail image, and second visual specification to the third user.

7. The method of claim 6, further comprising:
   detecting user input from the third user to select the second thumbnail image; and
   in response to the detected user input:
   displaying a data visualization interface for the third user;
   generating a data visualization according to the second visual specification, including retrieving a third data set from the database according to the set of one or more queries; and
   displaying the data visualization in the data visualization user interface of the third user.

8. A system for data visualization collaboration, comprising:
   a display;
   one or more processors;
   memory; and
   one or more programs stored in the memory and configured for execution by the one or more processors, the one or more programs comprising instructions for:
     displaying a data visualization user interface, including a comment pane, for a second user, the comment pane displaying a first comment, from a first user, the first comment including (i) first comment text, (ii) a first thumbnail image of a data visualization, and (iii) a first visual specification that includes a first set of parameters that specify how to build a data visualization, wherein the first set of parameters (i) specifies one or more data sources, (ii) specifies one or more data fields from the one or more data sources, and (iii) specifies associations between the one of more data fields and visual properties of the data visualization;
     in response to detecting a first user input from the second user to select the first thumbnail image:
       retrieving a result set from a database according to a set of one or more database queries determined from the first visual specification;
       generating the data visualization according to (i) the first visual specification and (ii) the result set; and
       displaying the data visualization in the data visualization user interface;

receiving one or more user inputs from the second user modifying the displayed data visualization;

in response to receiving a second user input in the comment pane, from the second user, specifying second comment text for a second comment that refers to the modified data visualization:

capturing a second thumbnail image of the modified data visualization; and saving a second visual specification that specifies a second set of parameters to build the modified data visualization from the result set, wherein the second set of parameters is different from the first set of parameters; and transmitting the second comment text, the second thumbnail image, and the second visual specification to the first user.

9. The system of claim 8, wherein saving the second visual specification comprises:

identifying the second set of parameters that specify how to build the modified data visualization from the dataset; and for each parameter of the second set of parameters:

when the respective parameter matches a corresponding parameter in the first visual specification, not storing the respective parameter in the second visual specification; and when the respective parameter does not match a corresponding respective parameter in the first visual specification, determining and storing a respective parameter difference in the second visual specification.

10. The system of claim 8, wherein the one or more programs further comprise instructions for:

prior to displaying the data visualization:

determining whether the second user has limited permission to access the dataset;

in accordance with a determination that the second user has limited permission to access the dataset, aborting the display of the data visualization; and in accordance with a determination that the second user has unlimited permission to access to the dataset, displaying the data visualization.

11. The system of claim 8, wherein the first visual specification further includes display parameters of the display used by the first user, and wherein displaying the data visualization for the second user further includes resizing the data visualization according to display parameters of the display.

12. The system of claim 8, wherein the first visual specification and the second visual specification each contain a full set of parameters necessary for building a data visualization from a data set.

13. The system of claim 8, wherein the one or more programs further comprise instructions for:

detecting an identifier in the second comment that corresponds to a third user; and in response to the detected identifier, sending the second comment text, second thumb nail image, and second visual specification to the third user.

14. The system of claim 13, wherein the one or more programs further comprise instructions for:

detecting user input from the third user to select the second thumbnail image; and in response to the detected user input:

displaying a data visualization interface for the third user;

generating a data visualization according to the second visual specification, including retrieving a third dataset from the database according to the set of one or more queries; and displaying the data visualization in the data visualization user interface.

15. A non-transitory computer-readable storage medium storing one or more programs configured for execution by a computer system having a display, one or more processors, and memory, the one or more programs comprising instructions for:

displaying a data visualization user interface, including a comment pane, for a second user, the comment pane displaying a first comment, from a first user, the first comment including (i) first comment text, (ii) a first thumbnail image of a data visualization, and (iii) a first visual specification that includes a first set of parameters that specify how to build a data visualization, wherein the first set of parameters (i) specifies one or more data sources, (ii) specifies one or more data fields from the one or more data sources, and (iii) specifies associations between the one of more data fields and visual properties of the data visualization;

in response to detecting a first user input from the second user to select the first thumbnail image:

retrieving a result set from a database according to a set of one or more database queries determined from the first visual specification;

generating the data visualization according to (i) the first visual specification and (ii) the result set; and displaying the data visualization in the data visualization user interface;

receiving one or more user inputs from the second user modifying the displayed data visualization;

in response to receiving a second user input in the comment pane, from the second user, specifying second comment text for a second comment that refers to the modified data visualization:

capturing a second thumbnail image of the modified data visualization; and saving a second visual specification that specifies a second set of parameters to build the modified data visualization from the result set, wherein the second set of parameters is different from the first set of parameters; and transmitting the second comment text, the second thumbnail image, and the second visual specification to the first user.

16. The non-transitory computer-readable storage medium of claim 15, wherein saving the second visual specification comprises:

identifying the second set of parameters that specify how to build the modified data visualization from the dataset; and for each parameter of the second set of parameters:

when the respective parameter matches a corresponding parameter in the first visual specification, not storing the respective parameter in the second visual specification; and when the respective parameter does not match a corresponding respective parameter in the first visual specification, determining and storing a respective parameter difference in the second visual specification.

17. The non-transitory computer-readable storage medium of claim 15, wherein the one or more programs further comprise instructions for:

prior to displaying the data visualization:
determining whether the second user has limited permission to access the dataset;
in accordance with a determination that the second user has limited permission to access the dataset, aborting the display of the data visualization; and
in accordance with a determination that the second user has unlimited permission to access to the dataset, displaying the data visualization.

18. The non-transitory computer-readable storage medium of claim 15, wherein the first visual specification further includes display parameters of the display used by the first user, and wherein displaying the data visualization for the second user further includes resizing the data visualization according to display parameters of the display at the computer.

19. The non-transitory computer-readable storage medium of claim 15, wherein the first visual specification and the second visual specification each contain a full set of parameters necessary for building a data visualization from a data set.

20. The non-transitory computer-readable storage medium of claim 15, wherein the one or more programs further comprise instructions for:
detecting an identifier in the second comment that corresponds to a third user; and
in response to the detected identifier, sending the second comment text, second thumb nail image, and second visual specification to the third user.

* * * * *